United States Patent
Kajiyama et al.

(10) Patent No.: US 12,456,932 B2
(45) Date of Patent: Oct. 28, 2025

(54) POWER CONVERSION DEVICE

(71) Applicant: Mitsubishi Electric Corporation, Tokyo (JP)

(72) Inventors: Takuya Kajiyama, Tokyo (JP); Toshiyuki Fujii, Tokyo (JP); Shuhei Fujiwara, Tokyo (JP); Kazuyori Tahata, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 234 days.

(21) Appl. No.: 18/254,584

(22) PCT Filed: Dec. 9, 2020

(86) PCT No.: PCT/JP2020/045900
§ 371 (c)(1),
(2) Date: May 25, 2023

(87) PCT Pub. No.: WO2022/123697
PCT Pub. Date: Jun. 16, 2022

(65) Prior Publication Data
US 2024/0022183 A1   Jan. 18, 2024

(51) Int. Cl.
*H02M 7/5395* (2006.01)
*H02M 1/00* (2007.01)
*H02M 7/483* (2007.01)

(52) U.S. Cl.
CPC ....... *H02M 7/5395* (2013.01); *H02M 1/0012* (2021.05); *H02M 1/0054* (2021.05); *H02M 7/4835* (2021.05)

(58) Field of Classification Search
CPC ............. H02M 7/5395; H02M 7/4835; H02M 1/0054; H02M 1/0012; H02M 1/322; H02M 1/36
See application file for complete search history.

(56) References Cited

U.S. PATENT DOCUMENTS 10,205,402 B2 * 2/2019 Fujii ................. H02M 1/12
12,057,787 B2 * 8/2024 Kajiyama ........... H02M 7/4833
(Continued)

FOREIGN PATENT DOCUMENTS

| CN | 203193515 U | * | 9/2013 | ............. H02M 1/08 |
| EP | 4131765 A1 | | 2/2023 | |

(Continued)

OTHER PUBLICATIONS

Machine Translation JP-6779424-B1 (Year: 220).*
(Continued)

*Primary Examiner* — Thienvu V Tran
*Assistant Examiner* — Yahveh Comas Torres
(74) *Attorney, Agent, or Firm* — Buchanan Ingersoll & Rooney PC

(57) ABSTRACT

A power conversion device includes a power converter including a plurality of arms each having a plurality of converter cells cascaded to each other. A control device includes an AC current controller to control AC current flowing between the power converter and an AC circuit and a circulating current controller to control circulating current flowing between the arms of the power converter. The AC current controller reduces an effective value or amplitude value of AC current in a discharge operation mode in which a voltage of a power storage element of each converter cell is discharged, compared with in a normal operation mode. The circulating current controller increases an effective value or amplitude value of circulating current in the discharge operation mode, compared with in the normal operation mode.

9 Claims, 20 Drawing Sheets

(56) References Cited

U.S. PATENT DOCUMENTS

| | | | | |
|---|---|---|---|---|
| 12,212,251 | B2 * | 1/2025 | Nakayama | H02M 7/797 |
| 2018/0309386 | A1 * | 10/2018 | Ishii | H02M 7/53875 |

FOREIGN PATENT DOCUMENTS

| | | | | | |
|---|---|---|---|---|---|
| JP | 2016100926 | A | * | 5/2016 | |
| JP | 2018093637 | A | | 6/2018 | |
| JP | 6752401 | B1 | * | 9/2020 | H02M 1/0025 |
| JP | 6779424 | B1 | * | 11/2020 | H02M 1/0003 |
| JP | 6783419 | B1 | * | 11/2020 | H02M 1/0043 |

OTHER PUBLICATIONS

Machine translation JP-6783419-B1 (Year: 2020).*
Machine Translation JP-6752401-B1 (Year: 2020).*
Machine Translation JP-2016100926-A (Year: 2016).*
Machine Translation (Year: 2013).*
Li Jinke et al: "Capacitor Voltage Reduction in Modular Multilevel Converters Under Grid Voltages Unbalances", IEEE Transactions On Power Delivery, IEEE Service Center, New York, NY, US, vol. 35, No. 1, May 28, 2019 (May 28, 2019), pp. 160-170, (Year: 2019).*
Extended European Search Report dated Dec. 18, 2023, issued in the corresponding European Patent Application No. 20965080.3, 10 pages.
Jinke, et al., "Capacitor Voltage Reduction in Modular Multilevel Converters Under Grid Voltages Unbalances", IEEE Transactions on Power Delivery, vol. 35, No. 1, Feb. 2020, pp. 160-170.
Li, et al., "Analysis and Reduction Method of MMC Capacitor Voltage Ripple Operation Boundary based on Circulating-Current Control", IEEE Energy Conversion Congress and Exposition (ECCE), Portland, OR, USA, Sep. 23, 2018, pp. 3038-3043.
International Search Report (PCT/ISA/210) with translation and Written Opinion (PCT/ISA/237) mailed on Feb. 2, 2021, by the Japan Patent Office as the International Searching Authority for International Application No. PCT/JP2020/045900. (8 pages).

* cited by examiner (A)

(B)

(A)

(B)

(A)

(B)

POWER CONVERSION DEVICE

TECHNICAL FIELD

The present disclosure relates to a power conversion device.

BACKGROUND ART

Modular multilevel converters (MMC) are known, which are configured such that a plurality of unit converters (hereinafter also referred to as converter cells) are connected in cascade. MMCs are widely applied to power transmission and distribution systems because they can easily handle high voltage by increasing the number of converter cells connected in cascade. Examples of the application include large-capacity STATCOMs (static synchronous compensators) and AC/DC power conversion devices for high voltage direct current power transmission (HVDC power transmission). STATCOMs are also referred to as static var compensators (SVCs).

Each converter cell that constitutes an MMC includes a plurality of switches (hereinafter also referred to as switching elements) and a power storage element (hereinafter also referred to as a capacitor). There are a variety of configurations of converter cells, such as half bridge circuits (hereinafter also referred to as chopper circuits) and full bridge circuits.

In the MMC, it is requested that a power storage element disposed for each converter cell in a distributed manner is discharged quickly when a charge voltage of the power storage element increases above a prescribed value or when the operation of the MMC is stopped.

For example, Japanese Patent Laying-Open No. 2018-093637 (PTL 1) discloses that a resistor element is provided in parallel with each switching element in the inside of a converter cell. One of a positive electrode-side switching element and a negative electrode-side switching element connected in series is controlled to turn on and the other is controlled to turn off so that discharge energy output from the capacitor is consumed.

CITATION LIST

Patent Literature

PTL 1: Japanese Patent Laying-Open No. 2018-093637

SUMMARY OF INVENTION

Technical Problem

In the MMC described in Japanese Patent Laying-Open No. 2018-093637 (PTL 1) above, a resistor element is physically provided for each converter cell, which may increase the size and the cost of the power conversion device.

The present disclosure is made in view of the background described above, and an object in an aspect is to provide a power conversion device that achieves discharge of the capacitor provided in each converter cell in a short time while minimizing additional physical discharge mechanisms.

Solution to Problem

A power conversion device according to an aspect includes a power converter including a plurality of arms each having a plurality of converter cells cascaded to each other, and a control device to control the power converter. Each of the arms is electrically connected to a corresponding phase of an AC circuit. Each of the converter cells includes a pair of input/output terminals, a plurality of switching elements, and a power storage element electrically connected to the input/output terminals through the switching elements. The control device includes an AC current controller to control AC current flowing between the power converter and the AC circuit and a circulating current controller to control circulating current flowing between the arms of the power converter. The circulating current controller controls the circulating current such that an imbalance in voltage of the power storage elements between different arms in a first operation mode. The circulating current controller lowers a voltage of the power storage element of each of the converter cells constituting the power converter by increasing an effective value or amplitude value of the circulating current in a second operation mode, compared with in the first operation mode. The AC current controller reduces an effective value or amplitude value of the AC current in the second operation mode, compared with in the first operation mode.

Advantageous Effects of Invention

In the power conversion device according to the aspect above, an effective value or amplitude value of the AC current is reduced and an effective value or amplitude value of the circulating current is increased in the second operation mode, compared with in the first operation mode, thereby achieving discharge of the capacitor provided in each converter cell in a short time.

DESCRIPTION OF EMBODIMENTS

Figure 1:
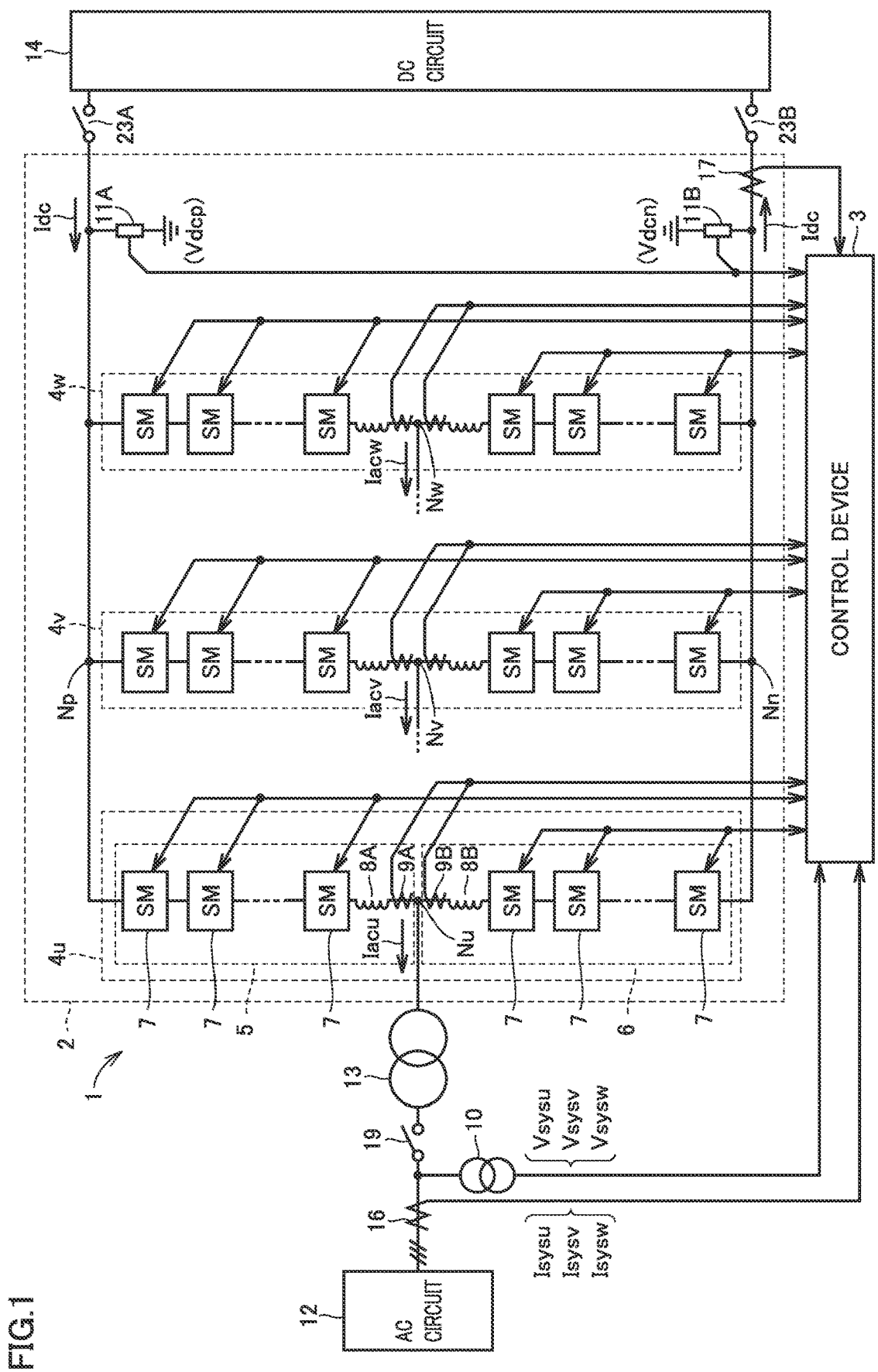
FIG. 1 is a schematic configuration diagram of a power conversion device in a first embodiment.

Embodiments will be described in detail below with reference to the drawings. Like or corresponding parts are denoted by like reference numerals and a description thereof will not always be repeated.

First Embodiment

[Overall Configuration of Power Conversion Device]

FIG. 1 is a schematic configuration diagram of a power conversion device in a first embodiment. Referring to FIG. 1, a power conversion device 1 is configured with a modular multilevel converter (MMC) including a plurality of converter cells connected to each other in series. "Converter cell" may be referred to as "submodule", "SM", or "unit converter". Power conversion device 1 performs power conversion between a DC circuit 14 and an AC circuit 12. Power conversion device 1 includes a power converter 2 and a control device 3.

Power converter 2 includes a plurality of leg circuits 4u, 4v, and 4w (denoted as leg circuit 4 when they are collectively referred to or any one of them is referred to) connected in parallel to each other between a positive-electrode DC terminal (that is, high potential-side DC terminal) Np and a negative-electrode DC terminal (that is, low potential-side DC terminal) Nn.

Leg circuit 4 is provided for each of a plurality of phases that constitute alternating current. Leg circuit 4 is connected between AC circuit 12 and DC circuit 14 to perform power conversion between those circuits. In FIG. 1, AC circuit 12 is a three-phase AC system and three leg circuits 4u, 4v, and 4w are provided respectively corresponding to U phase, V phase, and W phase.

AC input terminals Nu, Nv, and Nw provided for leg circuits 4u, 4v, and 4w, respectively, are connected to AC circuit 12 through a transformer 13. An AC circuit breaker 19 is provided between transformer 13 and AC circuit 12. AC circuit 12 is, for example, an AC power system including an AC power source. In FIG. 1, for simplification of illustration, the connection between AC input terminals Nv and Nw and transformer 13 is not shown. Three phase AC lines are depicted as one transmission line.

High potential-side DC terminal Np and low potential-side DC terminal Nn connected in common to leg circuits 4 are connected to DC circuit 14. A DC circuit breaker 23A is provided between high potential-side DC terminal Np and DC circuit 14, and a DC circuit breaker 23B is provided between low potential-side DC terminal Nn and DC circuit 14. DC circuit 14 is, for example, a DC power system including a DC power grid or a DC terminal of another power conversion device. In the latter case, two power conversion devices are coupled to constitute a back to back (BTB) system for connecting AC power systems with different rated frequencies.

Instead of using transformer 13 in FIG. 1, an interconnecting reactor may be used to connect to AC circuit 12. Furthermore, instead of AC input terminals Nu, Nv, and Nw, leg circuits 4u, 4v, and 4w may be provided with respective primary windings, and leg circuits 4u, 4v, and 4w may be connected in terms of AC to transformer 13 or the interconnecting reactor through secondary windings magnetically coupled to the primary windings. In this case, the primary windings may be reactors 8A and 8B described below. That is, leg circuits 4 are electrically (that is, in terms of DC or AC) connected to AC circuit 12 through connections provided for leg circuits 4u, 4v, and 4w, such as AC input terminals Nu, Nv, and Nw or the primary windings.

Leg circuit 4u includes an upper arm 5 from high potential-side DC terminal Np to AC input terminal Nu and a lower arm 6 from low potential-side DC terminal Nn to AC input terminal Nu. AC input terminal Nu that is a connection point between upper arm 5 and lower arm 6 is connected to transformer 13. High potential-side DC terminal Np and low potential-side DC terminal Nn are connected to DC circuit 14. Leg circuits 4v and 4w have a similar configuration and hereinafter leg circuit 4u will be described as a representative.

Upper arm 5 includes a plurality of cascaded converter cells 7 and a reactor 8A. A plurality of converter cells 7 and reactor 8A are connected in series. Similarly, lower arm 6 includes a plurality of cascaded converter cells 7 and a reactor 8B. A plurality of converter cells 7 and reactor 8B are connected in series.

In the following description, the number of converter cells 7 included in each of upper arm 5 and lower arm 6 is denoted as Ncell. Here, Ncell≥2. When individual converter cells 7 included in each of upper arm 5 and lower arm 6 are distinguished from each other, they are denoted as converter cells 7_1 to 7_Ncell.

Reactor 8A may be inserted at any position in upper arm 5 of leg circuit 4u, and reactor 8B may be inserted at any position in lower arm 6 of leg circuit 4u. A plurality of reactors 8A and a plurality of reactors 8B may be provided. The inductances of the reactors may be different from each other. Only reactor 8A of upper arm 5 or only reactor 8B of lower arm 6 may be provided.

Power conversion device 1 further includes an AC voltage detector 10, an AC current detector 16, DC voltage detectors 11A and 11B, arm current detectors 9A and 9B provided in each leg circuit 4, and a DC current detector 17, as detectors for measuring the quantity of electricity (current, voltage, etc.) used for control. Signals detected by these detectors are input to control device 3.

In FIG. 1, for simplification of illustration, signal lines of signals input from the detectors to control device 3 and signal lines of signals input and output between control device 3 and converter cells 7 are partially collectively illustrated, but they are actually provided for each detector and for each converter cell 7. The signal line between each converter cell 7 and control device 3 may be provided separately for transmission and for reception. The signal line may be formed of, for example, an optical fiber.

Each detector will now be described specifically.

AC voltage detector 10 detects a U phase AC voltage Vsysu, a V phase AC voltage Vsysv, and a W phase AC voltage Vsysw of AC circuit 12. In the following description, Vsysu, Vsysv, and Vsysw may be collectively denoted as Vsys. AC voltages Vacu, Vacv, and Vacw at AC input terminals Nu, Nv, and Nw of power converter 2 can be determined from AC voltages Vsysu, Vsysv, and Vsysw detected by AC voltage detector 10, in consideration of a transformer ratio of transformer 13 and an impedance drop. In the following description, alternating currents Vacu, Vacv, and Vacw may be collectively denoted as Vac.

AC current detector 16 detects U phase AC current Isysu, V phase AC current Isysv, and W phase AC current Isysw of AC circuit 12. In the following description, Isysu, Isysv, and Isysw may be collectively denoted as Isys. AC current is positive when it is output from power converter 2 to AC circuit 12.

DC voltage detector 11A detects a DC voltage Vdcp at high potential-side DC terminal Np connected to DC circuit 14. DC voltage detector 11B detects a DC voltage Vdcn at low potential-side DC terminal Nn connected to DC circuit 14. The difference between DC voltage Vdcp and DC voltage Vdcn is a DC voltage Vdc.

DC current detector 17 detects a DC current Idc flowing through high potential-side DC terminal Np or low potential-side DC terminal Nn. In the following description, DC current is positive when it flows from DC circuit 14 to high potential-side DC terminal Np and when it flows from low potential-side DC terminal Nn to DC circuit 14.

Arm current detectors 9A and 9B provided in leg circuit 4u for U phase respectively detect an upper arm current Ipu flowing through upper arm 5 and a lower arm current Inu flowing through lower arm 6. Arm current detectors 9A and 9B provided in leg circuit 4v for V phase respectively detect an upper arm current Ipv and a lower arm current Inv. Arm current detectors 9A and 9B provided in leg circuit 4w for W phase respectively detect an upper arm current Ipw and a lower arm current Inw. In the following description, upper arm currents Ipu, Ipv, and Ipw may be collectively denoted as upper arm current Iarmp, lower arm currents Inu, Inv, and Inw may be collectively denoted as lower arm current Iarmn, and upper arm current Iarmp and lower arm current Iarmn may be collectively denoted as Iarm. The arm current is positive when it flows from high potential-side DC terminal Np to low potential-side DC terminal Nn.

U phase AC current Iacu, V phase AC current Iacv, and W phase AC current Iacw output from power converter 2 to AC circuit 12 can be represented using arm current Iarm. Specifically, AC current Iac of each phase can be represented as follows.

$$Iacu = Ipu - Inu \quad (1)$$

$$Iacv = Ipv - Inv \quad (2)$$

$$Iacw = Ipw - Inw \quad (3)$$

In the following description, Iacu, Iacv, and Iacw may be collectively denoted as Iac.

AC current Iac represented by the above equations (1) to (3) corresponds to a secondary-side current of the transformer (current on the power converter 2 side). Ideally, AC current Iac and AC current Isys detected by AC current detector 16 are different only by the transformer ratio of transformer 13. When an interconnecting reactor is used instead of transformer 13, AC current Iac and AC current Isys agree. In control device 3, instead of AC current Iac calculated by the above equations (1) to (3), AC current Isys measured by AC current detector 16 may be used.

DC current Idc flowing from DC circuit 14 to high potential-side DC terminal Np of power converter 2 also can be represented using arm current Iarm. Specifically, DC current Idc is represented as follows.

$$Idc = (Ipu + Inu + Ipv + Inv + Ipw + Inw)/2 \quad (4)$$

Current flowing through a closed circuit in power converter 2 without including AC circuit 12 and DC circuit 14 in a path is referred to as circulating current. Circulating current Izu flowing through the U phase arm, circulating current Izv flowing through the V phase arm, and circulating current Izw flowing through W phase arm can be defined as follows.

$$Izu = (Ipu + Inu)/2 - Idc/3 \quad (5)$$

$$Izv = (Ipv + Inv)/2 - Idc/3 \quad (6)$$

$$Izw = (Ipw + Inw)/2 - Idc/3 \quad (7)$$

Phase circulating currents Izu, Izv, and Izw are collectively denoted as Iz.

Configuration Example of Converter Cell

Figure 2:
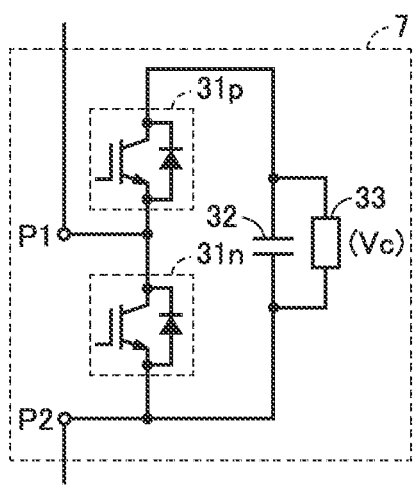
FIG. 2 is a circuit diagram showing a configuration example of a converter cell that constitutes a power converter.
Figure 2:
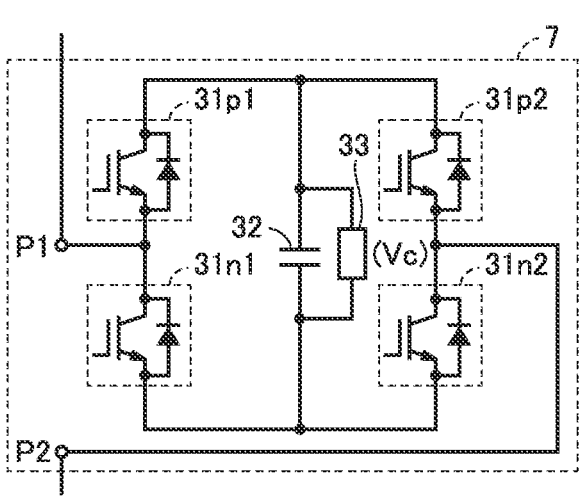

FIG. 2 is a circuit diagram showing a configuration example of a converter cell that constitutes a power converter.

Converter cell 7 shown in (A) in FIG. 2 has a circuit configuration called half bridge configuration. This converter cell 7 includes a series of two switching elements 31p and 31n connected in series, a power storage element 32, a voltage detector 33, and input/output terminals P1 and P2. The series of switching elements 31p and 31n and power storage element 32 are connected in parallel. Voltage detector 33 detects a voltage Vc between both ends of power storage element 32.

Both terminals of switching element 31n are connected to input/output terminals P1 and P2. Converter cell 7 outputs voltage Vc of power storage element 32 or zero voltage to between input/output terminals P1 and P2, through switching operation of switching elements 31p and 31n. When switching element 31p turns on and switching element 31n turns off, voltage Vc of power storage element 32 is output from converter cell 7. When switching element 31p turns off and switching element 31n turns on, converter cell 7 outputs zero voltage.

Converter cell 7 shown in (B) in FIG. 2 has a circuit configuration called full bridge configuration. This converter cell 7 includes a first series of two switching elements 31p1 and 31n1 connected in series, a second series of two switching elements 31p2 and 31n2 connected in series, a power storage element 32, a voltage detector 33, and input/output terminals P1 and P2. The first series, the second series, and power storage element 32 are connected in parallel. Voltage detector 33 detects a voltage Vc between both ends of power storage element 32.

The midpoint between switching element 31p1 and switching element 31n1 is connected to input/output terminal P1. Similarly, the midpoint between switching element 31p2 and switching element 31n2 is connected to input/output terminal P2. Converter cell 7 outputs voltage Vc and −Vc of power storage element 32 or zero voltage to between input/output terminals P1 and P2, through switching operation of switching elements 31p1, 31n1, 31p2, and 31n2.

In (A) and (B) in FIG. 2, switching elements 31p, 31n, 31p1, 31n1, 31p2, and 31n2 are configured, for example, such that a freewheeling diode (FWD) is connected in antiparallel with a self turn-off semiconductor switching element such as insulated gate bipolar transistor (IGBT) and gate commutated turn-off (GCT) thyristor.

In (A) and (B) in FIG. 2, a capacitor such as a film capacitor is mainly used for power storage element 32. In the following description, power storage element 32 may be called capacitor. Hereinafter voltage Vc of power storage element 32 may be referred to as capacitor voltage Vc.

As shown in FIG. 1, converter cells 7 are cascaded. In each of (A) and (B) in FIG. 2, in converter cell 7 arranged in upper arm 5, input/output terminal P1 is connected to input/output terminal P2 of adjacent converter cell 7 or high potential-side DC terminal Np, and input/output terminal P2 is connected to input/output terminal P1 of adjacent converter cell 7 or AC input terminal Nu. Similarly, in converter cell 7 arranged in lower arm 6, input/output terminal P1 is connected to input/output terminal P2 of adjacent converter cell 7 or AC input terminal Nu, and input/output terminal P2 is connected to input/output terminal P1 of adjacent converter cell 7 or low potential-side DC terminal Nn.

In the following, converter cell 7 has the half bridge cell configuration shown in (A) in FIG. 2, a semiconductor switching element is used as a switching element, and a capacitor is used as a power storage element. However, converter cell 7 that constitutes power converter 2 may have the full bridge configuration shown in (B) in FIG. 2. A converter cell other than the configuration described above by way of example, for example, a converter cell having a circuit configuration called clamped double cell may be used, and the switching element and the power storage element are also not limited to the examples above.

[Control Device]

Figure 3:
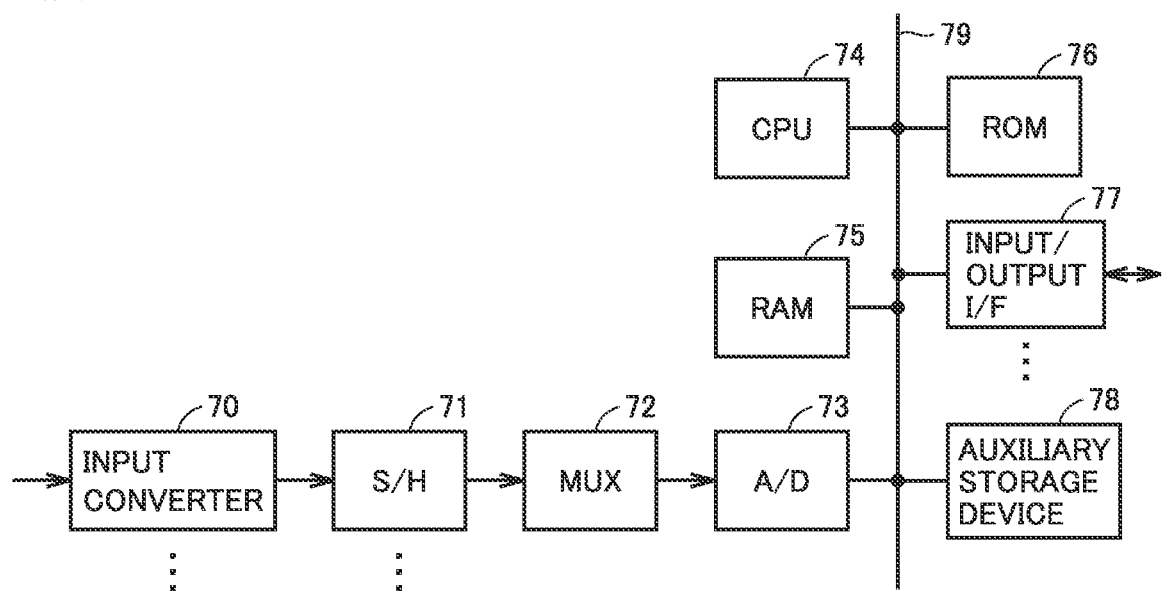
FIG. 3 is a block diagram showing a hardware configuration example of a control device.

FIG. 3 is a block diagram showing a hardware configuration example of control device 3. FIG. 3 shows an example in which control device 3 is configured with a computer.

Referring to FIG. 3, control device 3 includes one or more input converters 70, one or more sample and hold (S/H) circuits 71, a multiplexer (MUX) 72, and an analog-to-digital (A/D) converter 73. Control device 3 further includes one or more central processing units (CPU) 74, a random access memory (RAM) 75, and a read only memory (ROM) 76. Control device 3 further includes one or more input/output interfaces 77, an auxiliary storage device 78, and a bus 79 connecting the components above to each other.

Input converter 70 includes an auxiliary transformer (not shown) for each input channel. Each auxiliary transformer converts a detection signal from each electrical quantity detector in FIG. 1 into a signal at a voltage level suitable for subsequent signal processing.

Sample and hold circuit 71 is provided for each input converter 70. Sample and hold circuit 71 samples a signal representing the electrical quantity received from the corresponding input converter 70 at a predetermined sampling frequency and holds the signal.

Multiplexer 72 successively selects the signals held by a plurality of sample and hold circuits 71. A/D converter 73 converts a signal selected by multiplexer 72 into a digital value. A plurality of A/D converters 73 may be provided to perform A/D conversion of detection signals of a plurality of input channels in parallel.

CPU 74 controls the entire control device 3 and performs computational processing under instructions of a program.

RAM 75 as a volatile memory and ROM 76 as a nonvolatile memory are used as a main memory of CPU 74. ROM 76 stores a program and setting values for signal processing. Auxiliary storage device 78 is a nonvolatile memory having a larger capacity than ROM 76 and stores a program and data such as electrical quantity detected values.

Input/output interface 77 is an interface circuit for communication between CPU 74 and an external device.

Unlike the example of FIG. 3, at least a part of control device 3 may be configured using circuitry such as a field programmable gate array (FPGA) and an application specific integrated circuit (ASIC). That is, the function of each functional block shown in FIG. 3 can be configured based on the computer illustrated in FIG. 3 and may be at least partially configured with circuitry such as an FPGA and an ASIC. At least part of the function of each functional block may be configured with an analog circuit.

Figure 4:
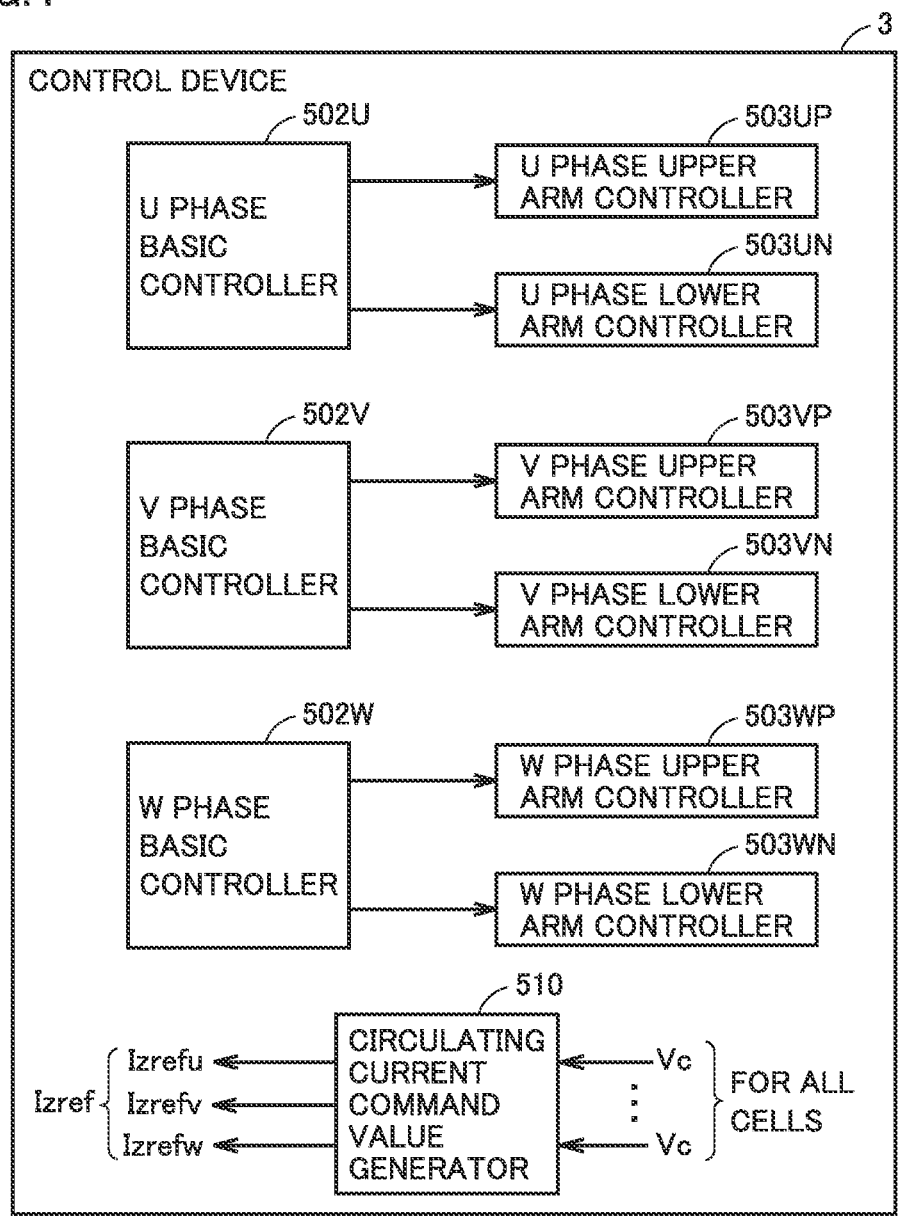
FIG. 4 is a functional block diagram illustrating an internal configuration of the control device shown in FIG. 1.

FIG. 4 is a functional block diagram illustrating an internal configuration of control device 3 shown in FIG. 1. Control device 3 controls the on and off of switching elements 31p and 31n of each converter cell 7, as one of its control functions.

Control device 3 includes a U-phase basic controller 502U, a U-phase upper arm controller 503UP, a U-phase lower arm controller 503UN, a V-phase basic controller 502V, a V-phase upper arm controller 503VP, a V-phase lower arm controller 503VN, a W-phase basic controller 502W, a W-phase upper arm controller 503WP, a W-phase lower arm controller 503WN, and a circulating current command value generator 510.

In the following description, U-phase basic controller 502U, V-phase basic controller 502V, and W-phase basic controller 502W may be denoted as basic controller 502 when they are collectively referred to or an unspecified one is referred to. U-phase upper arm controller 503UP, V-phase upper arm controller 503VP, and W-phase upper arm controller 503WP may be denoted as upper arm controller 503P when they are collectively referred to or an unspecified one is referred to. U-phase lower arm controller 503UN, V-phase lower arm controller 503VN, and W-phase lower arm controller 503WN may be denoted as lower arm controller 503N when they are collectively referred to or an unspecified one is referred to. Upper arm controller 503P and lower arm controller 503N are collectively denoted as arm controller 503.

A configuration example of basic controller 502 will be described with reference to FIG. 6, and a configuration example of arm controller 503 will be described with reference to FIG. 7. In the following, a configuration example of circulating current command value generator 510 will be described first. Circulating current command value generator 510 generates a circulating current command value Izrefu for u phase, a circulating current command value Izrefv for v phase, and a circulating current command value Izrefw for w phase. In the following description, the circulating current command values for the respective phases are denoted as circulating current command value Izref when they are collectively referred to or a circulating current command value for an unspecified phase is referred to.

Figure 5:
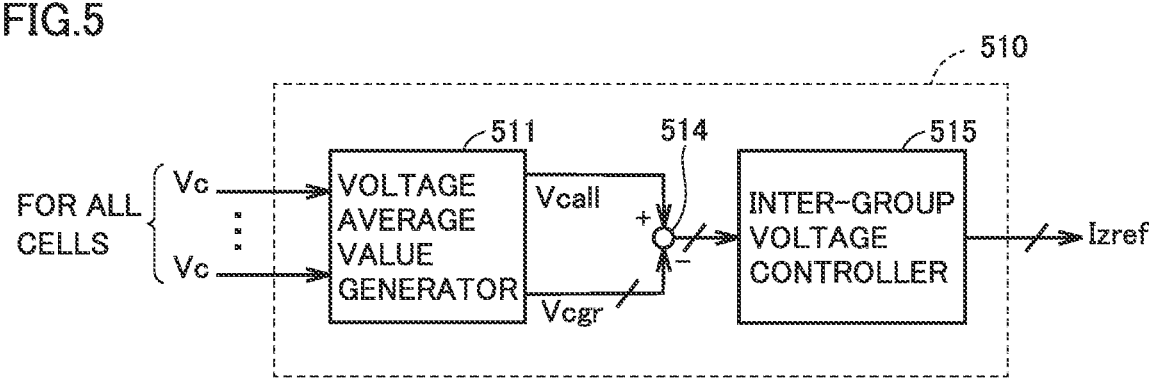
FIG. 5 is a block diagram showing a configuration example of a circulating current command value generator in FIG. 4 in detail.

FIG. 5 is a block diagram showing a configuration example of the circulating current command value generator in FIG. 4 in detail. Referring to FIG. 5, circulating current command value generator 510 includes a voltage average value generator 511, an inter-group voltage controller 515, and a subtractor 514.

Voltage average value generator 511 receives capacitor voltage Vc detected by voltage detector 33 from each converter cell 7. Voltage average value generator 511 generates an all-voltage average value Vcall indicating the average value of accumulated energy of capacitors 32 of all converter cells 7 in power converter 2, and an each-group voltage average value Vcgr which is the average value of accumulated energy of capacitors 32 of converter cells 7 for each predetermined group, from capacitor voltages Vc of converter cells 7.

For example, each-group voltage average value Vcgr includes a U-phase voltage average value Vcgu, a V-phase voltage average value Vcgv, and a W-phase voltage average value Vcgw each indicating the average value of accumulated energy of a plurality of (2×Ncell) converter cells 7 included in the corresponding one of leg circuits 4u (U phase), 4v (V phase), and 4w (W phase). Alternatively, each-group voltage average value Vcgr may include each-group voltage average value Vcgr indicating the average value of accumulated energy of a plurality of (Ncell) converter cells 7 included in each arm, for each of upper arm 5 and lower arm 6 for each leg circuit 4, instead of or in addition to the voltage average value for each leg circuit 4 (U phase, V phase, W phase). That is, each-group voltage average value Vcgr may include a U-phase upper arm voltage average value Vcgup, a U-phase lower arm voltage average value Vcgun, a V-phase upper arm voltage average value Vcgvp, a V-phase lower arm voltage average value Vcgvn, a W-phase upper arm voltage average value Vcgwp, and a W-phase lower arm voltage average value Vcgwn.

Inter-group voltage controller 515 generates a circulating current command value Izref for each phase for compensating for an imbalance of accumulated energy between groups (between phase leg circuits or between arms), based on each-group voltage average value Vcgr for each phase generated by voltage average value generator 511. That is, inter-group voltage controller 515 generates a U-phase circulating current command value Izrefu, a V-phase circulating current command value Izrefv, and a W-phase circulating current command value Izrefw.

Specifically, subtractor 514 subtracts each-group voltage average value Vcgr from all-voltage average value Vcall. For example, when U-phase circulating current command value Izrefu is to be generated, subtractor 514 may receive U-phase voltage average value Vcgu as each-group voltage average value Vcgr and may further receive U-phase upper arm voltage average value Vcgup and U-phase lower arm voltage average value Vcgun. Inter-group voltage controller 515 generates u-phase circulating current command value Izrefu by performing computation on a deviation of U-phase voltage average value Vcgu from all-voltage average value Vcall that is calculated by subtractor 514. Alternatively, inter-group voltage controller 515 generates u-phase circulating current command value Izrefu by performing computation on each of a deviation of U-phase voltage average value Vcgu from all-voltage average value Vcall, a deviation of U-phase upper arm voltage average value Vcgup from all-voltage average value Vcall, and a deviation of U-phase lower arm voltage average value Vcgun from all-voltage average value Vcall and adding the computation results. Circulating current command value Izref corresponds to a circulating current value for eliminating an imbalance of accumulated energy in converter cells 7 between groups by equalizing the levels of capacitor voltages Vc of converter cells 7 between groups (between leg circuits and between arms for each phase).

For example, inter-group voltage controller 515 may be configured as a PI controller that performs proportional computation and integral computation on the deviation calculated by subtractor 514 or may configured as a PID controller that additionally performs derivative computation. Alternatively, inter-group voltage controller 515 may be configured using a configuration of another controller commonly used in feedback control.

Figure 6:
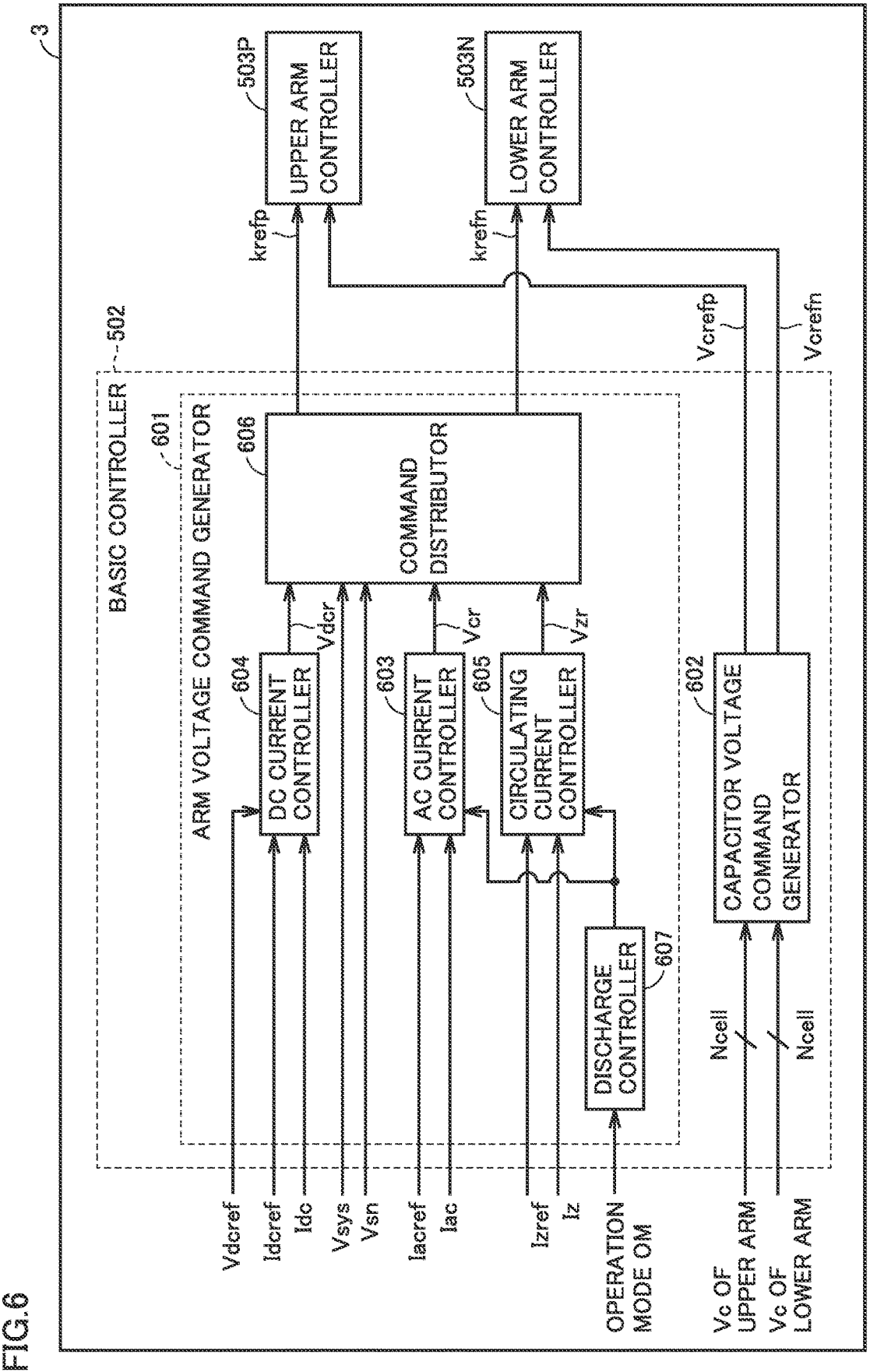
FIG. 6 is a diagram showing a configuration of each basic controller in FIG. 4 in more detail.

FIG. 6 is a diagram showing a configuration of each basic controller 502 in FIG. 4 in more detail. Referring to FIG. 6, basic controller 502 includes an arm voltage command generator 601 and a capacitor voltage command generator 602.

Arm voltage command generator 601 generates a voltage command value krefp of Ncell converter cells 7 included in upper arm 5 in FIG. 1 and a voltage command value krefn of Ncell converter cells 7 included in lower arm 6. Arm voltage command generator 601 outputs the generated voltage command value krefp to upper arm controller 503P and outputs the generated voltage command value krefn to lower arm controller 503N. In the following description, voltage command value krefp for upper arm 5 and voltage command value krefn for lower arm 6 are collectively denoted as voltage command value kref.

Capacitor voltage command generator 602 generates a capacitor voltage command value Vcrefp of capacitors 32 of Ncell converter cells 7 included in upper arm 5. Capacitor voltage command generator 602 further generates a capacitor voltage command value Vcrefn of capacitors 32 of Ncell converter cells 7 included in lower arm 6. Capacitor voltage command generator 602 outputs the generated capacitor voltage command value Vcrefp for upper arm 5 to upper arm controller 503P and outputs the generated capacitor voltage command value Vcrefn for lower arm 6 to lower arm controller 503N.

Capacitor voltage command value Vcrefp for upper arm 5 is, for example, the average voltage of capacitors 32 of converter cells 7 in the upper arm, and capacitor voltage command value Vcrefn for lower arm 6 is, for example, the average voltage of capacitors 32 of converter cells 7 in lower arm 6. In the following description, capacitor voltage command value Vcrefp for upper arm 5 and capacitor voltage command value Vcrefn for lower arm 6 are collectively denoted as capacitor voltage command value Vcref.

As shown in FIG. 6, more specifically, arm voltage command generator 601 includes an AC current controller 603, a DC current controller 604, a circulating current controller 605, a command distributor 606, and a discharge controller 607.

AC current controller 603 calculates an AC control command value Vcr for nullifying a deviation between the detected AC current Iac and the set AC current command value Iacref. Alternatively, AC current controller 603 calculates an AC control command value Vcr for nullifying a deviation between the detected AC current Iac and AC current command value Iacref changed by discharge controller 607. For example, AC current controller 603 may be configured as a PI controller that performs proportional computation and integral computation on the deviation or may configured as a PID controller that additionally performs derivative computation. Alternatively, AC current controller 603 may be configured using a configuration of another controller commonly used in feedback control.

DC current controller 604 calculates a DC control command value Vdcr for nullifying a deviation between the detected DC current Idc and the set DC current command value Idcref, based on the set DC voltage command value Vdcref and the set DC current command value Idcref. In doing so, DC voltage command value Vdcref may be computed based on the detected DC voltage Vdc.

Circulating current controller 605 calculates a circulating control command value Vzr for controlling the detected circulating current Iz to follow the set circulating current command value Izref or the circulating current command value Izref changed by discharge controller 607. The setting value of circulating current command value Izref is set, for example, to 0. The operation of discharge controller 607 will be described later.

Command distributor 606 receives AC control command value Vcr, circulating control command value Vzr, DC control command value Vdcr, neutral point voltage Vsn, and AC voltage Vsys. Since the AC side of power converter 2 is connected to AC circuit 12 through transformer 13, neutral point voltage Vsn can be determined from the voltage of the DC power source of DC circuit 14. DC control command value Vdcr may be determined by DC output control or may be a fixed value.

Command distributor 606 calculates a voltage output and shared by each of the upper arm and the lower arm, based on these inputs. Command distributor 606 determines arm voltage command value krefp of the upper arm and arm voltage command value krefn of the lower arm by subtracting a voltage drop due to an inductance component in the upper arm and the lower arm from the calculated voltage.

The determined arm voltage command value krefp of the upper arm and arm voltage command value krefn of the lower arm are output voltage commands for allowing AC current Iac to follow AC current command value Iacref, allowing circulating current Iz to follow circulating current command value Izref, allowing DC voltage Vdc to follow DC voltage command value Vdcref, and performing feed-forward control of AC voltage Vsys.

The operation of discharge controller 607 will now be described. A signal OM representing an operation mode of control device 3 is input to discharge controller 607. The MMC performs control such that the effective value of circulating current Iz becomes the minimum value necessary for continuing the operation of the power converter in order to minimize the loss of power converter 2 in a normal operation mode (also referred to as first operation mode).

On the other hand, the MMC in the present embodiment performs control such that the effective value of circulating current Iz is larger in a discharge operation mode (also referred to as second operation mode) than in normal control. Since a resistance component exists in the inside of power converter 2, feeding circulating current Iz increases the loss. This promotes discharge of capacitor 32 of each converter cell 7.

Specifically, when the operation mode switches from the normal operation mode to the discharge operation mode, discharge controller 607 changes circulating current command value Izref such that the effective value of circulating current Iz becomes larger than usual. More specifically, discharge controller 607 corrects circulating current command value Izref in the normal operation mode by adding a discharge control output value.

In intentionally feeding circulating current Iz, when power converter 2 is interconnected to an AC power system (AC circuit 12), it is necessary to feed circulating current Iz with a frequency other than the frequency of the system voltage. When power converter 2 is disconnected from the power system, any frequency may be used for the circulating current. It is desirable that the circulating current has a higher frequency since loss increase due to the skin effect is likely.

The effective value of circulating current Iz is maximized in a range in which switching elements 31 can operate safely, so that discharge of capacitor 32 of each converter cell 7 can be accelerated. Since the upper limit of arm current Iarm is determined for safe operation of switching element 31, it is desirable to set the amplitude value or effective value of AC current command value Iacref to a smaller value than in the normal operation mode in order to set the amplitude value or effective value of circulating current Iz to a larger value. Discharge controller 607 therefore sets the amplitude value or effective value of AC current command value Iacref to a smaller value in the discharge operation mode than in the normal operation mode. More specifically, discharge controller 607 corrects AC current command value Iacref by subtracting a discharge control output value.

Unlike the case in FIG. 6, the function of discharge controller 607 may be included in each of AC current controller 603 and circulating current controller 605. In this case, signal OM representing the operation mode of control device 3 is input to each of AC current controller 603 and circulating current controller 605.

Figure 7:
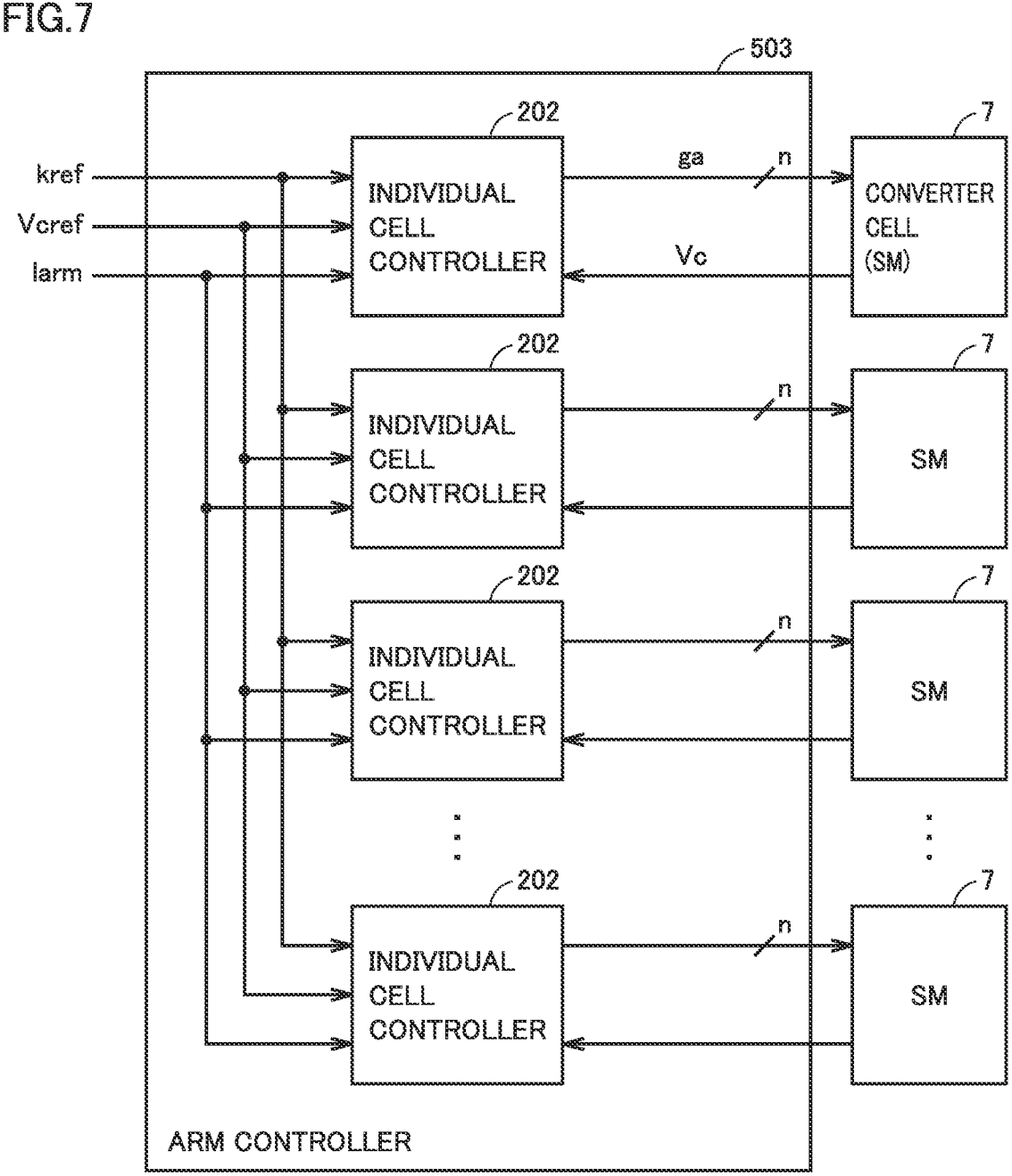
FIG. 7 is a block diagram illustrating a configuration example of an arm controller.

FIG. 7 is a block diagram illustrating a configuration example of arm controller 503. Referring to FIG. 7, arm controller 503 includes Ncell individual cell controllers 202.

Each individual cell controller 202 individually controls the corresponding converter cell 7. Individual cell controller 202 receives arm voltage command value kref, arm current Iarm, and capacitor voltage command value Vcref from basic controller 502.

Individual cell controller 202 generates a gate signal ga of the corresponding converter cell 7 and outputs the generated gate signal ga to the corresponding converter cell 7. In converter cell 7 in (A) in FIG. 2, gate signal ga is a signal for controlling the on and off of switching elements 31$p$ and 31$n$ (n=2). When converter cell 7 is the full bridge configuration in (B) in FIG. 2, respective gate signals for switching elements 31$p$1, 31$n$1, 31$p$2, and 31$n$2 are generated (n=4).

On the other hand, each individual cell controller 202 receives a detection value of capacitor voltage Vc from voltage detector 33 of the corresponding converter cell 7. Further, the detection value of capacitor voltage Vc from voltage detector 33 of each converter cell 7 is input to basic controller 502.

[Control Procedure of Power Converter 2 in Discharge Operation Mode]

The foregoing description of the control procedure of power converter 2 in the discharge operation mode will be summarized below.

Figure 8:
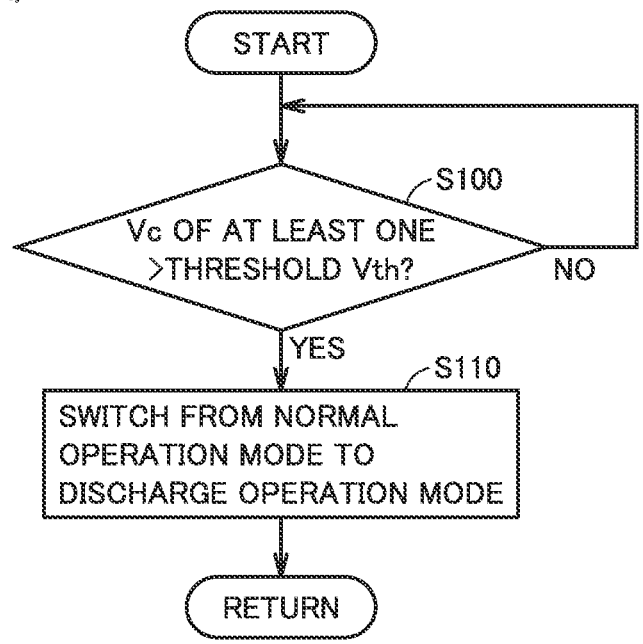
FIG. 8 is a flowchart illustrating a switching timing from a normal operation mode to a discharge operation mode.
Figure 8:
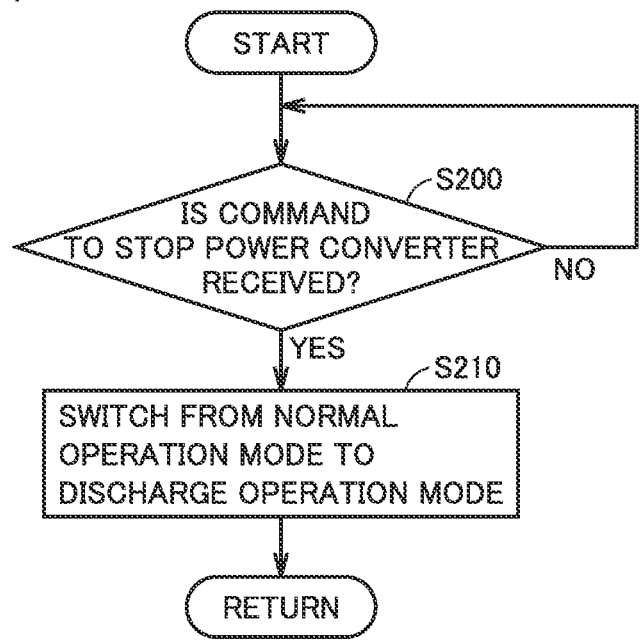

FIG. 8 is a flowchart illustrating a switching timing from the normal operation mode to the discharge operation mode. In an initial state, it is assumed that control device 3 is operating in the normal operation mode.

Referring to the flowchart (A) in FIG. 8, when at least one capacitor voltage Vc exceeds a threshold Vth (YES at step S100), control device 3 proceeds to step S110. At step S110, control device 3 switches the operation mode from the normal operation mode to the discharge operation mode.

Referring to the flowchart (B) in FIG. 8, when a command to stop power converter 2 is received (YES at step S200), control device 3 proceeds to step S210. At step S210, control device 3 switches the operation mode from the normal operation mode to the discharge operation mode.

Figure 9:
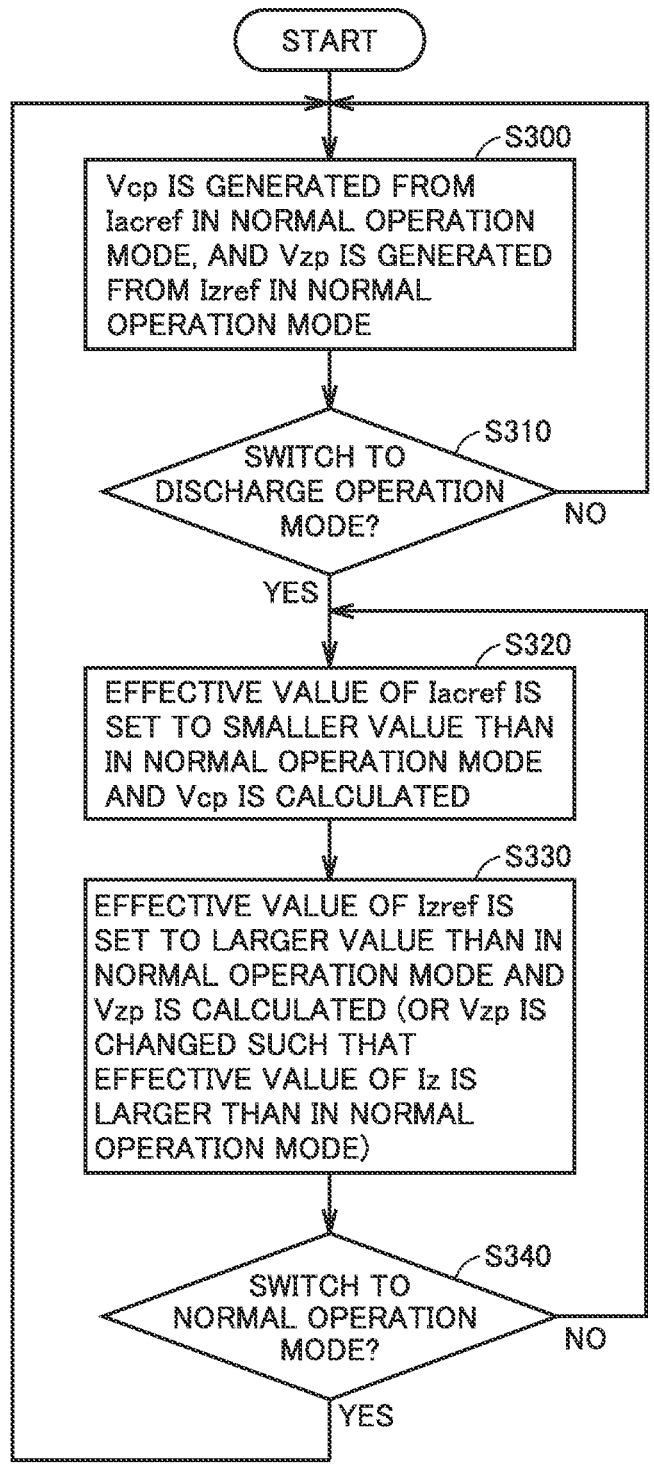
FIG. 9 is a flowchart illustrating the operation of a circulating current controller, a discharge controller, and an AC current controller in FIG. 6 in the discharge operation mode.

FIG. 9 is a flowchart illustrating the operation of the circulating current controller, the discharge controller, and the AC current controller in FIG. 6 in the discharge operation mode.

Referring to FIG. 6 and FIG. 9, at step S300 in FIG. 9, in the normal operation mode, AC current controller 603 generates AC control command value Vcr based on a deviation between the detected AC current Iac and AC current command value Iacref in the normal operation mode. Further, circulating control command value Vzr is generated based on a deviation between the detected circulating current Iz and circulating current command value Izref in the normal operation mode described with reference to FIG. 5. If the normal operation mode is continued (NO at step S310), the above step S300 is repeated.

If the normal operation mode is switched to the discharge operation mode (YES at step S310), control device 3 proceeds to step S320 and step S330. Either step S320 or step S330 may be executed first or they may be executed in parallel.

At step S320, AC current controller 603 sets the effective value or amplitude value of AC current command value Iacref to a smaller value than in the normal operation mode and calculates AC control command value Vcr.

At step S330, circulating current controller 605 sets the effective value or amplitude value of circulating current command value Izref to a larger value than in the normal operation mode and calculates circulating control command value Vzr. Alternatively, circulating current controller 605 may change circulating control command value Vzr such that the effective value or amplitude value of circulating current Iz is larger than in the normal operation mode, without changing circulating current command value Izref.

If the discharge operation mode is continued (NO at step S340), the above step S320 and step S330 are repeated. When the discharge operation mode is switched to the normal operation mode, control device 3 returns to step S300.

Effect of First Embodiment

In normal MMC control, in order to minimize the loss of power converter 2, the effective value or amplitude value of circulating current Iz is controlled to be a minimum value necessary for continuing the operation of power converter 2.

In power conversion device 1 in the first embodiment, when the operation mode switches from the normal operation mode to the discharge operation mode, control device 3 controls power converter 2 such that the effective value or amplitude value of circulating current Iz is larger than in the normal operation mode. Since a resistance component exists in the inside of power converter 2, feeding circulating current Iz increases the loss thereby prompting discharge of capacitor 32 of each converter cell 7.

Specifically, discharge controller 607 corrects circulating current command value Izref or circulating control command value Vzr such that the effective value or amplitude value of circulating current Iz is larger in the discharge operation mode than in the normal operation mode. More specifically, discharge controller 607 corrects circulating current command value Izref by adding a discharge control output.

In intentionally feeding circulating current Iz, when power converter 2 is interconnected to an AC power system (AC circuit 12), it is necessary to feed circulating current Iz with a frequency other than the frequency of the system voltage. When power converter 2 is disconnected from the AC power system (AC circuit 12), any frequency may be used for circulating current Iz. It is desirable that circulating current Iz has a higher frequency since loss increase due to the skin effect is likely.

Second Embodiment

In a second embodiment, power converter 2 is controlled such that the effective value or amplitude value of circulating current Iz is maximized in the range of safety operating area (SOA). This can accelerate discharge of capacitor 32 of each converter cell 7. As used herein SOA refers to a range of voltage and current in which a semiconductor element used as switching element 31 of converter cell 7 can safely perform switching.

The hardware configuration of power conversion device 1 and the functional configuration of control device 3 in the second embodiment are the same as in the first embodiment and will not be further elaborated.

Figure 10:
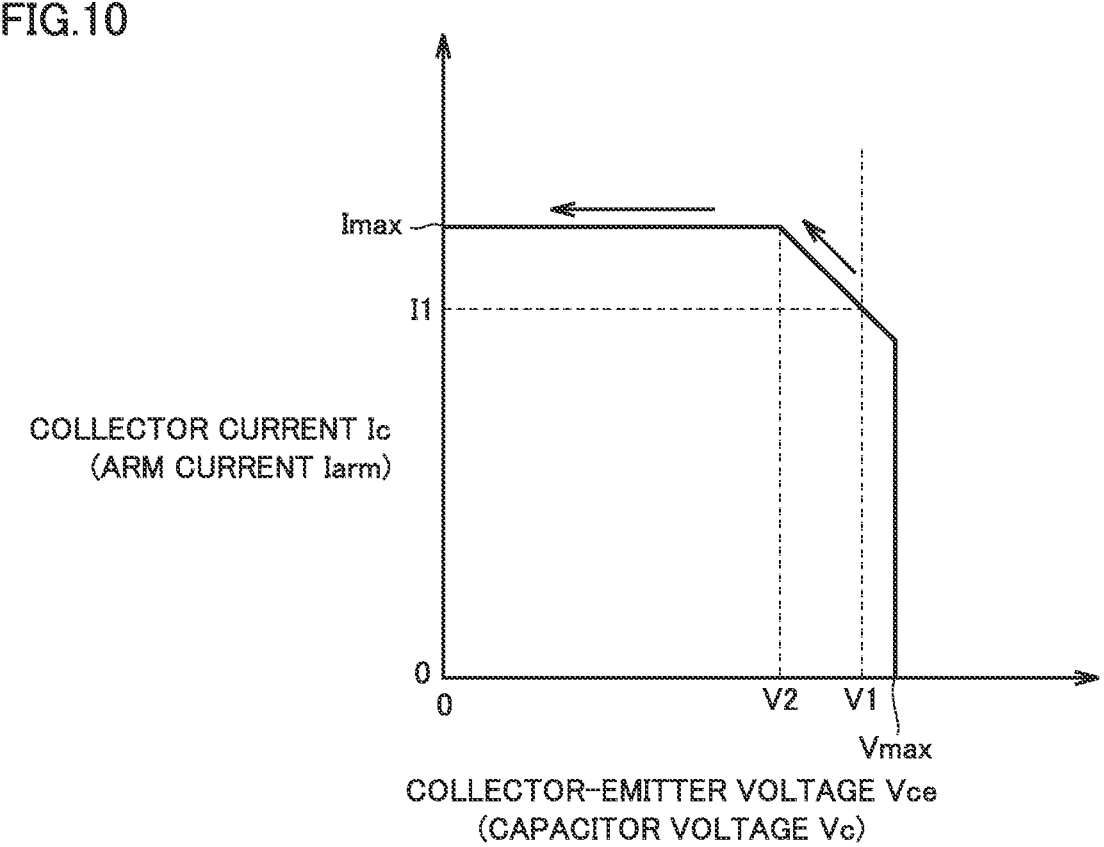
FIG. 10 is a diagram conceptually showing an example of SOA of an IGBT or a MOSFET.

Characteristics of Discharge Control in Power Conversion Device in Second Embodiment FIG. 10 is a diagram conceptually showing an example of SOA of an IGBT or a MOSFET. The vertical axis in FIG. 10 shows collector current Ic, and the horizontal axis in FIG. 10 shows collector-emitter voltage Vce. Collector current Ic corresponds to arm current Iarm flowing through each arm, and collector-emitter voltage Vce corresponds to capacitor voltage Vc of each converter cell 7.

As shown in FIG. 10, from 0 to V2 of collector-emitter voltage Vce, the upper limit of collector current Ic is a fixed value Imax. From V2 to Vmax of collector-emitter voltage Vce, as collector-emitter voltage Vce increases, the permitted collector current Ic decreases. In this way, the upper limit of collector current Ic changes with collector-emitter voltage Vce.

The magnitude of circulating current Iz therefore can be increased as much as possible by determining the magnitude of the effective value or amplitude value of circulating current Iz such that the peak value of arm current Iarm agrees with the upper limit of the SOA in accordance with capacitor voltage Vc. Further, since arm current Iarm is determined by the sum of AC current Iac, DC current Idc, and circulating current Iz, it is desirable to set the amplitude value or effective value of AC current command value Iacref to a smaller value than in the normal operation mode in order to set the amplitude value or effective value of circulating current Iz to a larger value.

Specifically, in the case of FIG. 10, it is assumed that the value V1 of capacitor voltage Vc is excessive. Since the upper limit of arm current Iarm in this case is I1, the amplitude value or effective value of circulating current Iz is determined such that the peak value of arm current Iarm agrees with I1. Thereafter, as capacitor voltage Vc decreases due to discharge of capacitor 32, the upper limit of arm current Iarm increases. Thus, the effective value or amplitude value of circulating current Iz is increased in accordance with the magnitude of capacitor voltage Vc. This enables safe and fast discharge of capacitor 32. When capacitor voltage Vc is equal to or lower than V2, the upper limit of SOA is constant at Imax. Circulating current controller 605 therefore determines the effective value or amplitude value of circulating current Iz such that the peak value of arm current Iarm agrees with the upper limit Imax of SOA.

[Control Procedure of Power Converter 2 in Discharge Operation Mode]

Figure 11:
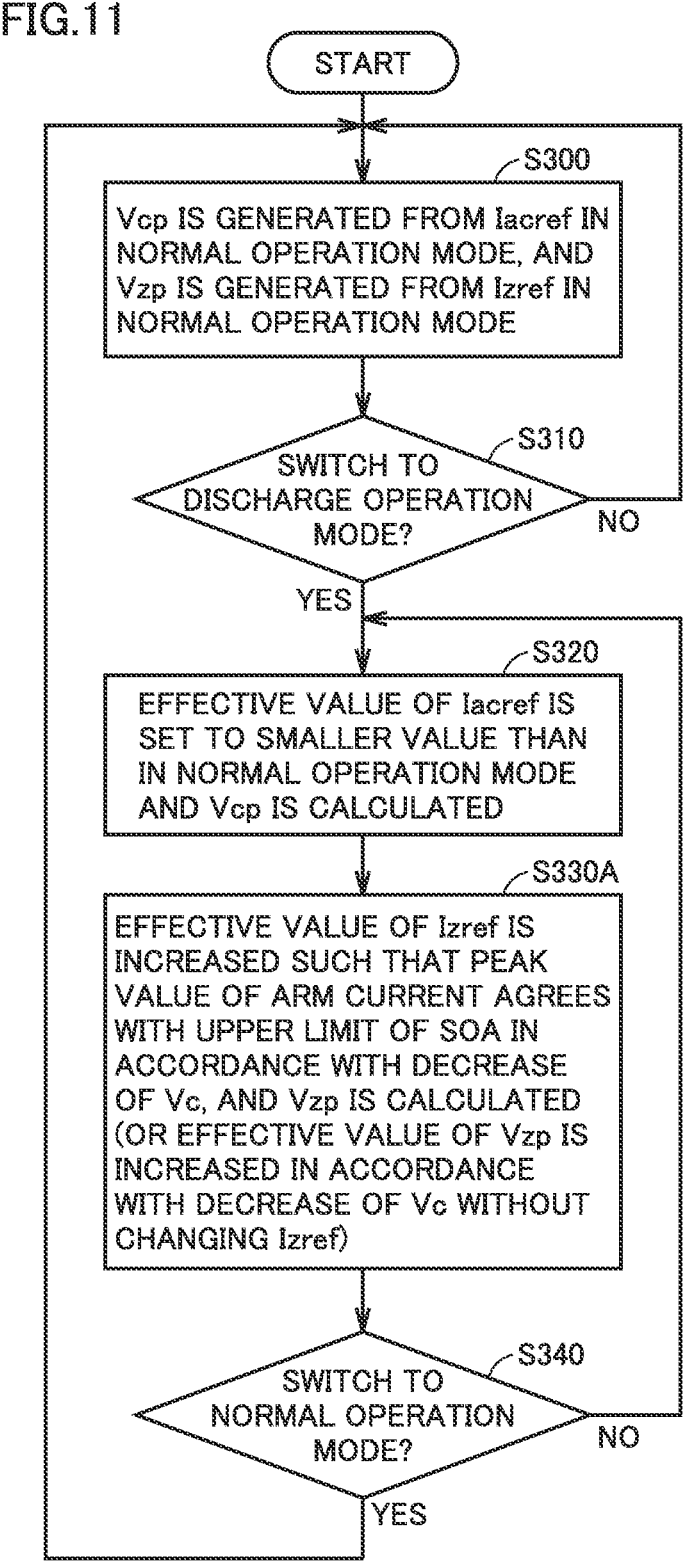
FIG. 11 is a flowchart illustrating the operation of a circulating current controller, a discharge controller, and an AC current controller in the discharge operation mode in a power conversion device in a second embodiment.

FIG. 11 is a flowchart illustrating the operation of the circulating current controller, the discharge controller, and the AC current controller in the discharge operation mode in the power conversion device in the second embodiment. The flowchart in FIG. 11 differs from the flowchart in FIG. 9 in that step S330 is changed to step S330A. The other steps in FIG. 11 are the same as those in FIG. 9 and the same or corresponding steps are denoted by the same reference signs and will not be further elaborated.

At step S330A in FIG. 11, circulating current controller 605 determines the effective value or amplitude value of circulating current command value Izref such that the peak value of arm current Iarm is equal to the upper limit of SOA in accordance with decrease of capacitor voltage Vc. Alternatively, circulating current controller 605 may change circulating control command value Vzr such that the peak value of arm current Iarm is equal to the upper limit of SOA in accordance with decrease of capacitor voltage Vc, without changing circulating current command value Izref.

Effect of Second Embodiment

As described above, in power conversion device 1 in the second embodiment, control device 3 controls power converter 2 such that the effective value or amplitude value of circulating current Iz is maximized in the range of SOA in the discharge operation mode. This enables fastest discharge of capacitor 32 without breaking switching element 31 of each converter cell 7.

Third Embodiment

In power conversion device 1 in a third embodiment, the carrier frequency in pulse width control is increased in the discharge operation mode. This can increase switching loss of switching element 31 and thereby accelerate discharge of capacitor 32.

In the following, a detailed configuration of individual cell controller 202 in FIG. 7 and the pulse width control will be described first, and then the characteristics of the discharge operation mode in power conversion device 1 in the third embodiment will be described. The hardware configuration of power conversion device 1 and the functional configuration of control device 3 in the third embodiment are the same as in the first embodiment and will not be further elaborated. The third embodiment can be combined with the second embodiment.

Figure 12:
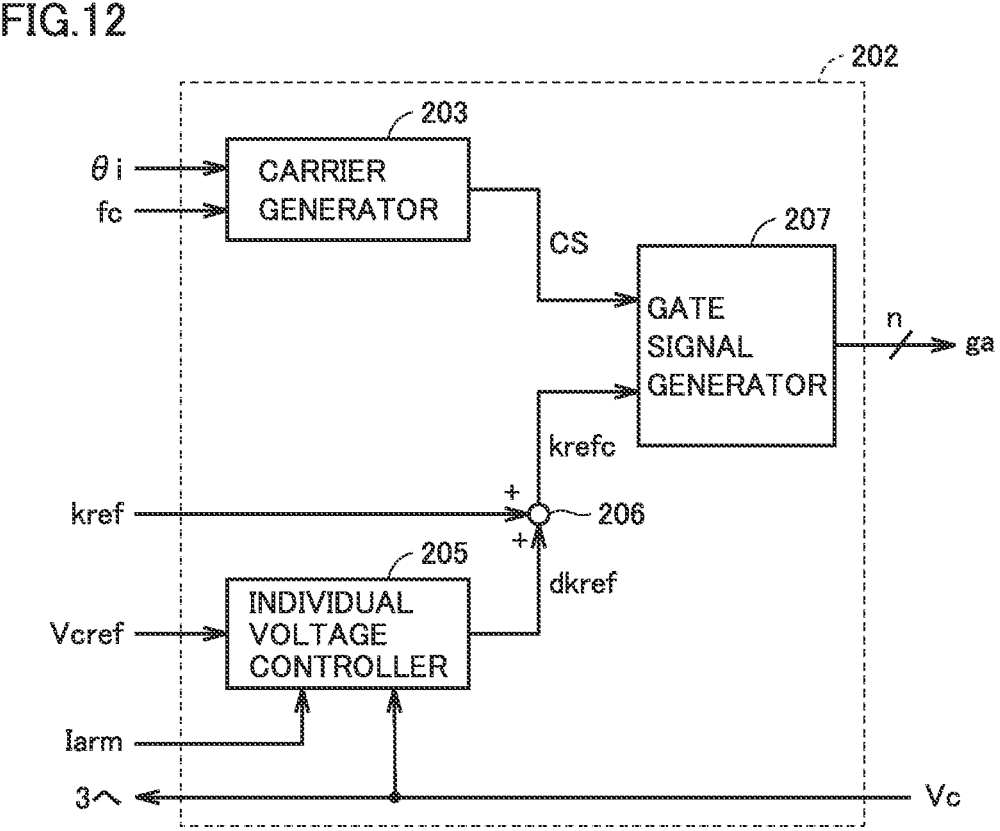
FIG. 12 is a block diagram showing a configuration example of an individual cell controller shown in FIG. 7.

FIG. 12 is a block diagram showing a configuration example of individual cell controller 202 shown in FIG. 7.

Referring to FIG. 12, individual cell controller 202 includes a carrier generator 203, an individual voltage controller 205, an adder 206, and a gate signal generator 207.

Carrier generator 203 generates a carrier signal CS having a predetermined frequency (that is, carrier frequency) for use in phase shift pulse width modulation (PWM) control. The phase shift PWM control allows the timings of PWM signals output to a plurality of (Ncell) converter cells 7 in the same arm (upper arm 5 or lower arm 6) to be shifted from each other. It is known that this can reduce harmonic components included in a synthesized voltage of output voltages of converter cells 7.

Carrier generator 203 generates carrier signal CS with phases shifted from each other among Ncell converter cells 7, based on a common reference phase Oi received from basic controller 502 and carrier frequency fc.

Individual voltage controller 205 receives capacitor voltage command value Vcref, capacitor voltage Vc of the corresponding converter cell 7, and the detection value of arm current Iarm of the arm to which the corresponding converter cell 7 belongs to. Capacitor voltage command value Vcref may be set to the average value of capacitor voltage Vc of the entire power converter 2 or may be set to the average value of capacitor voltages of Ncell converter cells 7 included in the same arm.

Individual voltage controller 205 performs computation on a deviation of capacitor voltage Vc from capacitor voltage command value Vcref and calculates a control output dkref for individual voltage control. Individual voltage controller 205 also may be configured with a controller that executes PI control or PID control. Further, control output dkref for charging/discharging capacitor 32 in a direction that eliminates the deviation is calculated by multiplying the computation value by the controller by "+1" or "−1" depending on the polarity of arm current Iarm. Alternatively, control output dkref for charging/discharging capacitor 32 in a direction that eliminates the deviation may be calculated by multiplying the computation value by arm current Iarm.

Adder 206 outputs a cell voltage command value krefc by adding arm voltage command value kref from basic controller 502 to control output dkref of individual voltage controller 205.

Gate signal generator 207 generates gate signal ga by performing PWM modulation of cell voltage command value krefc by carrier signal CS from carrier generator 203.

Figure 13:
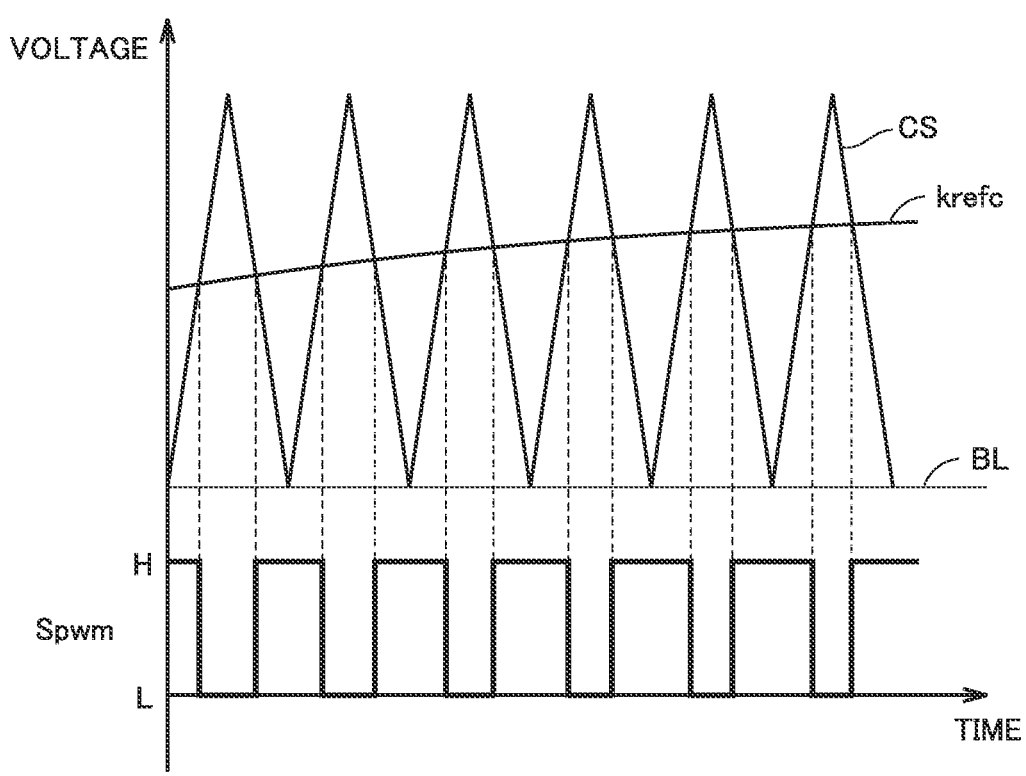
FIG. 13 is a conceptual waveform diagram illustrating PWM modulation control by a gate signal generator shown in FIG. 12.

FIG. 13 is a conceptual waveform diagram illustrating PWM modulation control by the gate signal generator shown in FIG. 12. The signal waveform shown in FIG. 13 is exaggerated for explanation and does not represent the actual signal waveform as it is.

Referring to FIG. 13, cell voltage command value krefc is compared in voltage with carrier signal CS typically formed of a triangular wave. When the voltage of cell voltage command value krefc is higher than the voltage of carrier signal CS, a PWM modulation signal Spwm is set to high level (H level). Conversely, when the voltage of carrier signal CS is higher than the voltage of cell voltage command value krefc, PWM modulation signal Spwm is set to low level (L level).

For example, in the H level period of PWM modulation signal Spwm, gate signal ga (n=2) is generated such that switching element 31p is turned on while switching element 31n is turned off in converter cell 7 in (A) in FIG. 2. Conversely, in the L level period of PWM modulation signal Spwm, gate signal ga (n=2) is generated such that switching element 31n is turned on while switching element 31p is turned off.

Gate signal ga is sent to the gate driver (not shown) of switching element 31p, 31n of converter cell 7 whereby the on and off of switching element 31p, 31n of converter cell 7 is controlled.

Cell voltage command value krefc corresponds to a sinusoidal wave voltage modified by control output dkref. In control device 3, therefore, a percent modulation command value in PWM modulation can be calculated by a known method from the amplitude (or effective value) of the sinusoidal wave voltage (arm voltage command value kref) and the amplitude of carrier signal CS.

[Control Procedure of Power Converter 2 in Discharge Operation Mode]

Figure 14:
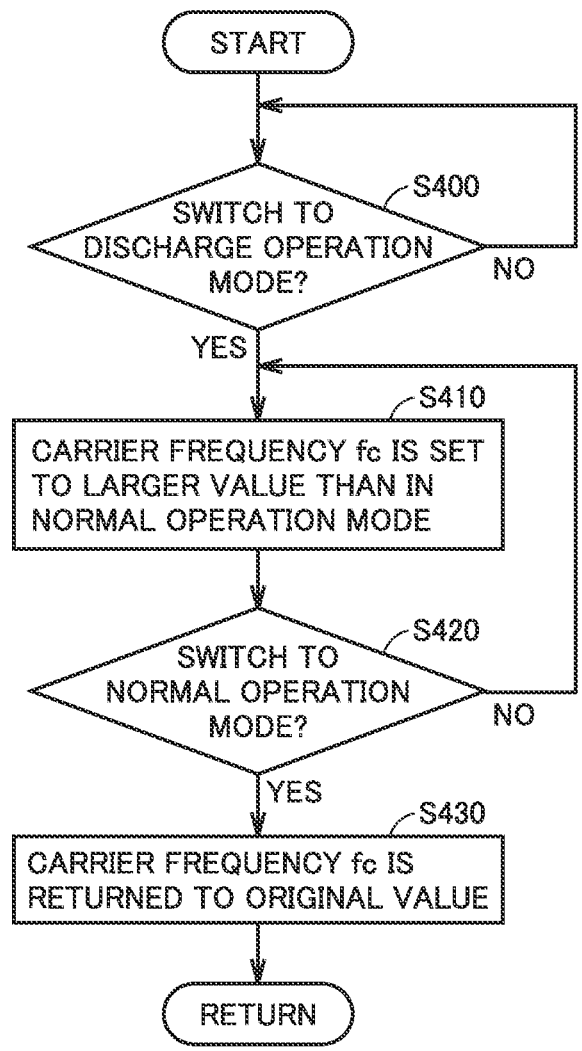
FIG. 14 is a flowchart illustrating the setting of a carrier frequency in a power converter in a third embodiment.

FIG. 14 is a flowchart illustrating the setting of a carrier frequency in the power converter in the third embodiment. In an initial state, it is assumed that control device 3 is in the normal operation mode.

If the normal operation mode is switched to the discharge operation mode (YES at step S400), control device 3 proceeds to step S410. At step S410, control device 3 sets the carrier frequency fc to a larger value than in the normal operation mode. Increasing carrier frequency fc to a frequency limit determined by the upper limit of operating temperature of switching element 31 can increase the loss of switching element 31, thereby accelerating discharge of capacitor 32.

If the discharge operation mode is kept (NO at step S410), the above step S410 is continued. On the other hand, if the discharge operation mode is switched to the normal operation mode (YES at step S410), at the next step S430, control device 3 returns carrier frequency fc to the original setting value in the normal operation mode.

Effect of Third Embodiment

As described above, in power conversion device 1 in the third embodiment, control device 3 sets carrier frequency fc in the phase shift PWM control to a larger value in the discharge operation mode than in the normal operation mode. This can increase switching loss of switching element 31 of converter cell 7 and thereby accelerate discharge of capacitor 32.

Fourth Embodiment

In power conversion device 1 in a fourth embodiment, active gate drive is used to increase the loss of switching element 31 in the discharge operation mode. This can accelerate discharge of capacitor 32. A specific description will be given below with reference to the drawings. The fourth embodiment can be combined with either the second or third embodiment.

Configuration Example of Active Gate Drive

Figure 15:
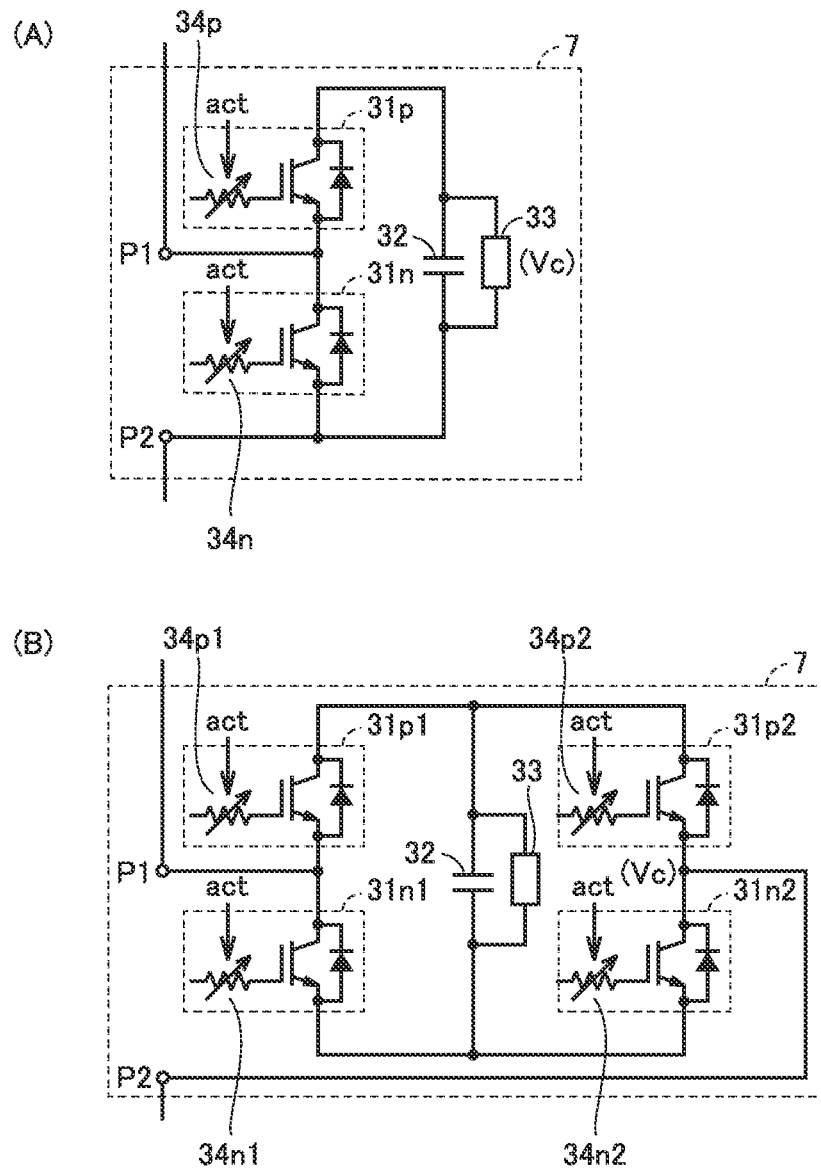
FIG. 15 is a circuit diagram showing a configuration example of a converter cell that constitutes a power converter in a power conversion device in a fourth embodiment.

FIG. 15 is a circuit diagram showing a configuration example of the converter cell that constitutes the power converter in the power conversion device in the fourth embodiment. In the fourth embodiment, converter cell 7 includes a gate driver capable of active gate drive of switching element 31.

Specifically, the circuit diagram (A) in FIG. 15 differs from the circuit diagram (A) in FIG. 2 in that it further includes gate resistors 34*p* and 34*n* with a variable resistance in accordance with a control signal act. Similarly, the circuit diagram (B) in FIG. 15 differs from the circuit diagram (B) in FIG. 2 in that it further includes gate resistors 34*p*1, 34*p*2, 34*n*1, and 34*n*2 with a variable resistance in accordance with a control signal act. The other parts in FIG. 15 are the same as those in FIG. 2 and the same or corresponding parts are denoted by the same reference signs and will not be further elaborated.

In FIG. 15, gate resistors 34*p* and 34*n* and gate resistors 34*p*1, 34*p*2, 34*n*1, and 34*n*2 are denoted as gate resistor 34 when they are collectively referred to or an unspecified one is referred to. In FIG. 15, a variable resistor is provided as gate resistor 34, but gate resistor 34 may be configured such that a resistance is changed by switching the connection of a plurality of resistors.

Figure 16:
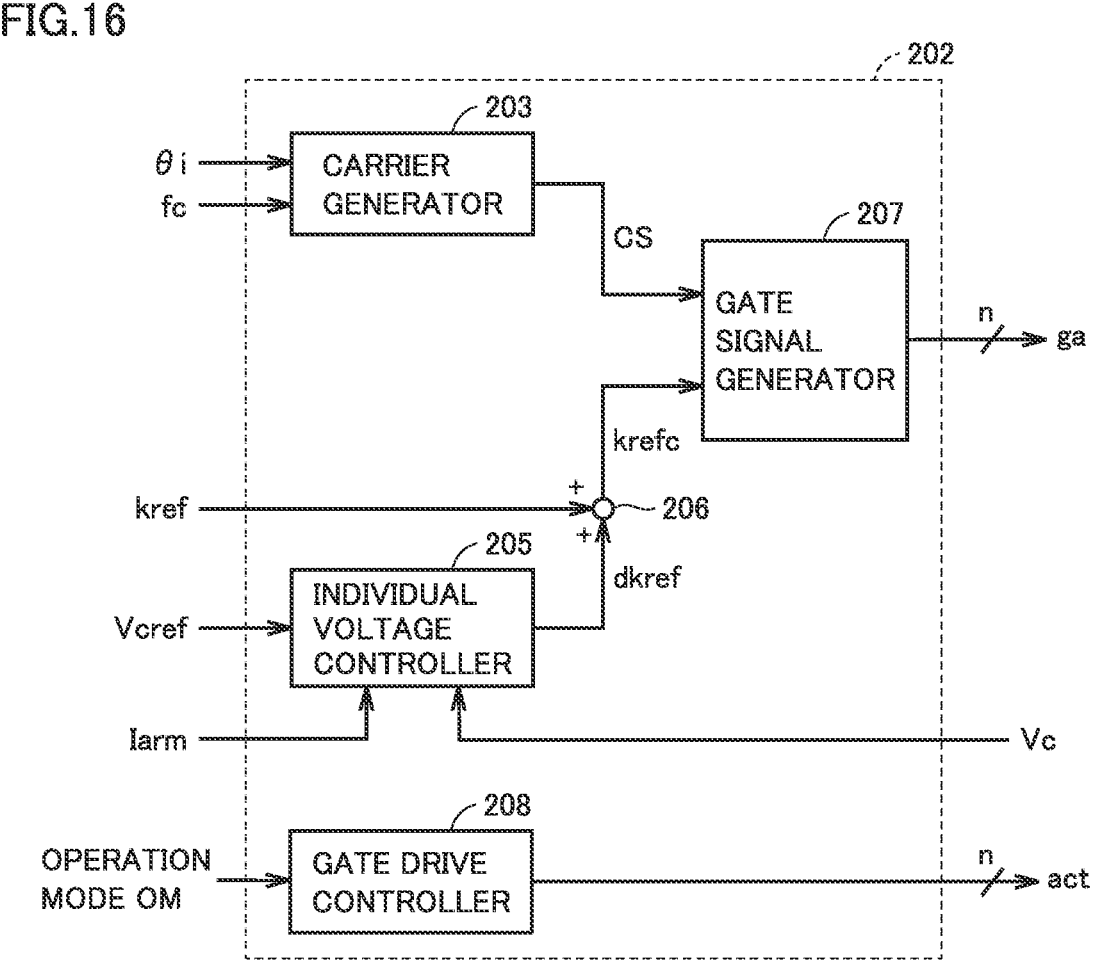
FIG. 16 is a block diagram showing a configuration example of an individual cell controller in the power conversion device in the fourth embodiment.

FIG. 16 is a block diagram showing a configuration example of the individual cell controller in the power conversion device in the fourth embodiment. Individual cell controller 202 in FIG. 16 differs from individual cell controller 202 in FIG. 12 in that it further includes a gate drive controller 208. The other parts in FIG. 16 are the same as those in FIG. 12 and the same or corresponding parts are denoted by the same reference signs and will not be further elaborated.

Referring to FIG. 15 and FIG. 16, gate drive controller 208 of individual cell controller 202 activates control signal act when the operation mode of control device 3 switches from the normal operation mode to the discharge operation mode. Gate drive controller 208 thus increases the gate resistance of the corresponding converter cell 7. As a result, the switching time of switching element 31 of converter cell 7 increases and thus the switching loss increases, thereby accelerating discharge of capacitor 32.

The method of active gate drive is not limited to the method that changes the gate resistance as long as the switching loss of switching element 31 is changed. For example, the switching time may be increased by a method other than increasing the gate resistance.

[Control Procedure of Power Converter 2 in Discharge Operation Mode]

Figure 17:
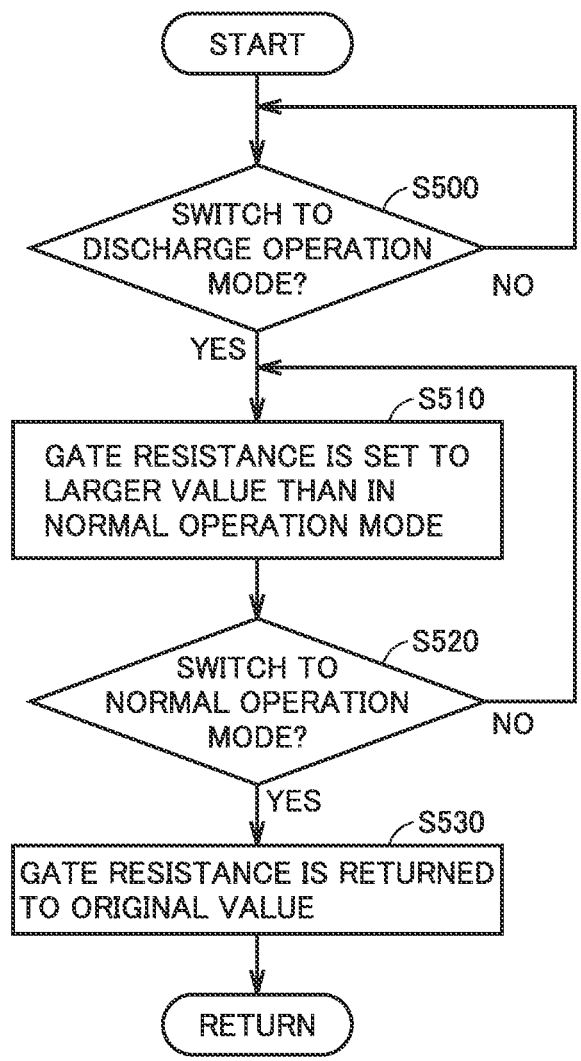
FIG. 17 is a flowchart illustrating the setting of a gate resistance in the power converter in the fourth embodiment.

FIG. 17 is a flowchart illustrating the setting of the gate resistance in the power converter in the fourth embodiment. In an initial state, it is assumed that control device 3 is in the normal operation mode.

If the normal operation mode is switched to the discharge operation mode (YES at step S500), control device 3 proceeds to step S510. At step S510, control device 3 sets the resistance of gate resistor 34 provided corresponding to switching element 31 of each converter cell 7 to a larger value than in the normal operation mode.

If the discharge operation mode is kept (NO at step S510), the above step S510 is continued. On the other hand, if the discharge operation mode is switched to the normal operation mode (YES at step S510), at the next step S530, control device 3 returns the gate resistance to the original setting value in the normal operation mode.

Effect of Fourth Embodiment

As described above, in power conversion device 1 in the fourth embodiment, control device 3 controls each converter cell 7 such that the loss of switching element 31 becomes larger than in the normal operation mode by using the active gate drive. This can accelerate discharge of capacitor 32.

Fifth Embodiment

In the MMC, it is common to provide a charge resistor between power converter 2 and an AC system in order to suppress charge current at startup. In power conversion device 1 in a fifth embodiment, a charge resistor is provided in each arm to increase the loss by circulating current Iz fed in the discharge operation mode. A detailed description will be given below with reference to the drawings. The fifth embodiment can be combined with any of the second to fourth embodiments.

[Configuration of Power Converter 2 and Control Device 3]

Figure 18:
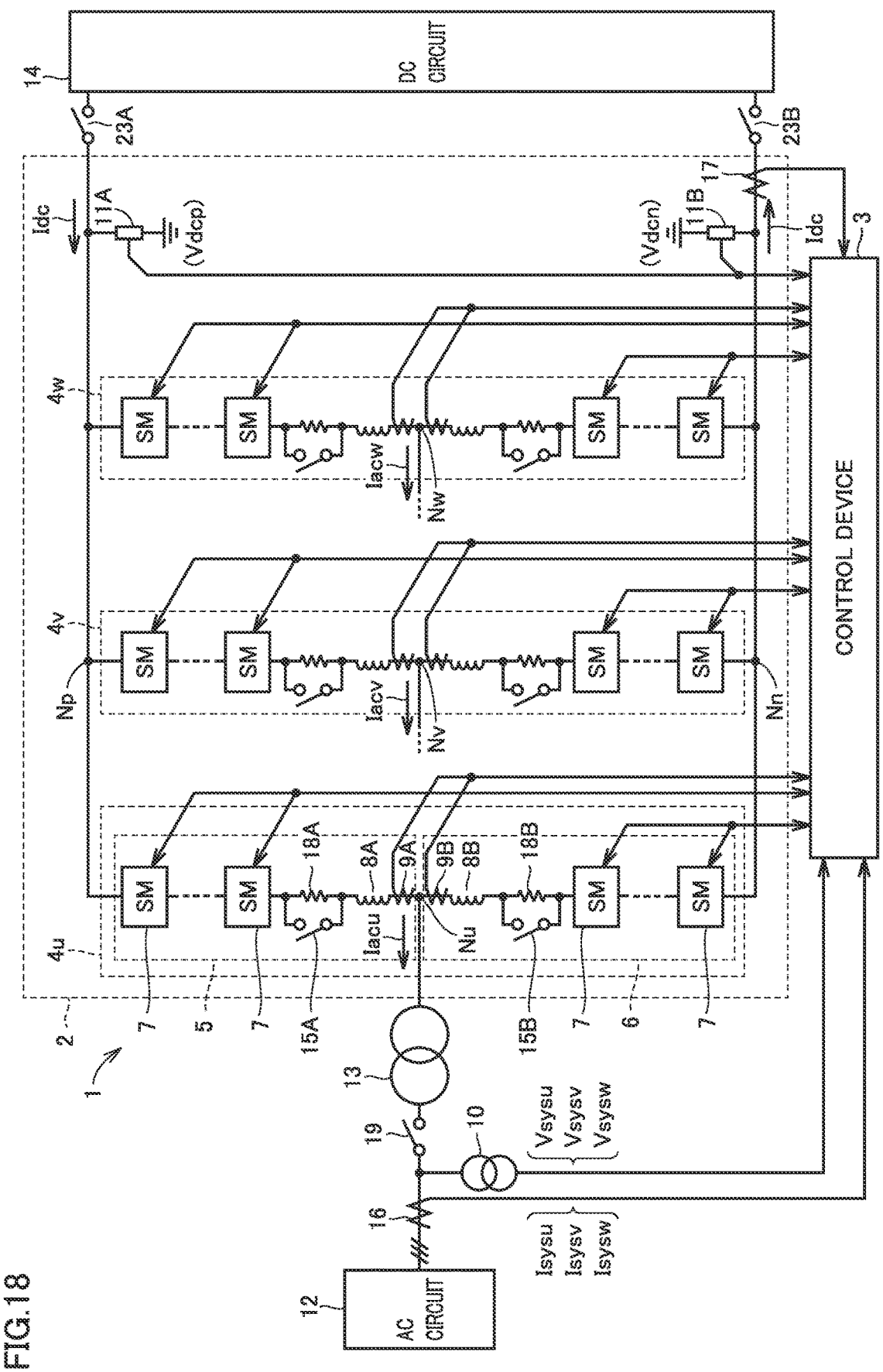
FIG. 18 is a schematic configuration diagram of a power conversion device in a power conversion device in a fifth embodiment.

FIG. 18 is a schematic configuration diagram of a power conversion device in power conversion device 1 in the fifth embodiment.

Each upper arm 5 in FIG. 18 differs from each upper arm 5 in FIG. 2 in that it further includes a charge resistor 18A provided in series with a plurality of converter cells 7 and reactor 8A and a bypass switch 15A connected in parallel with charge resistor 18A. Similarly, each lower arm 6 in FIG. 18 differs from each lower arm 6 in FIG. 2 in that it further includes a charge resistor 18B provided in series with a plurality of converter cells 7 and reactor 8B and a bypass switch 15B connected in parallel with charge resistor 18B.

Charge resistors 18A and 18B are denoted as charge resistor 18 when they are collectively referred to or an unspecified one is referred to. Bypass switches 15A and are denoted as bypass switch 15 when they are collectively referred to or an unspecified one is referred to. The other parts in FIG. 18 are the same as those in FIG. 1 and the same or corresponding parts are denoted by the same reference signs and will not be further elaborated.

Figure 19:
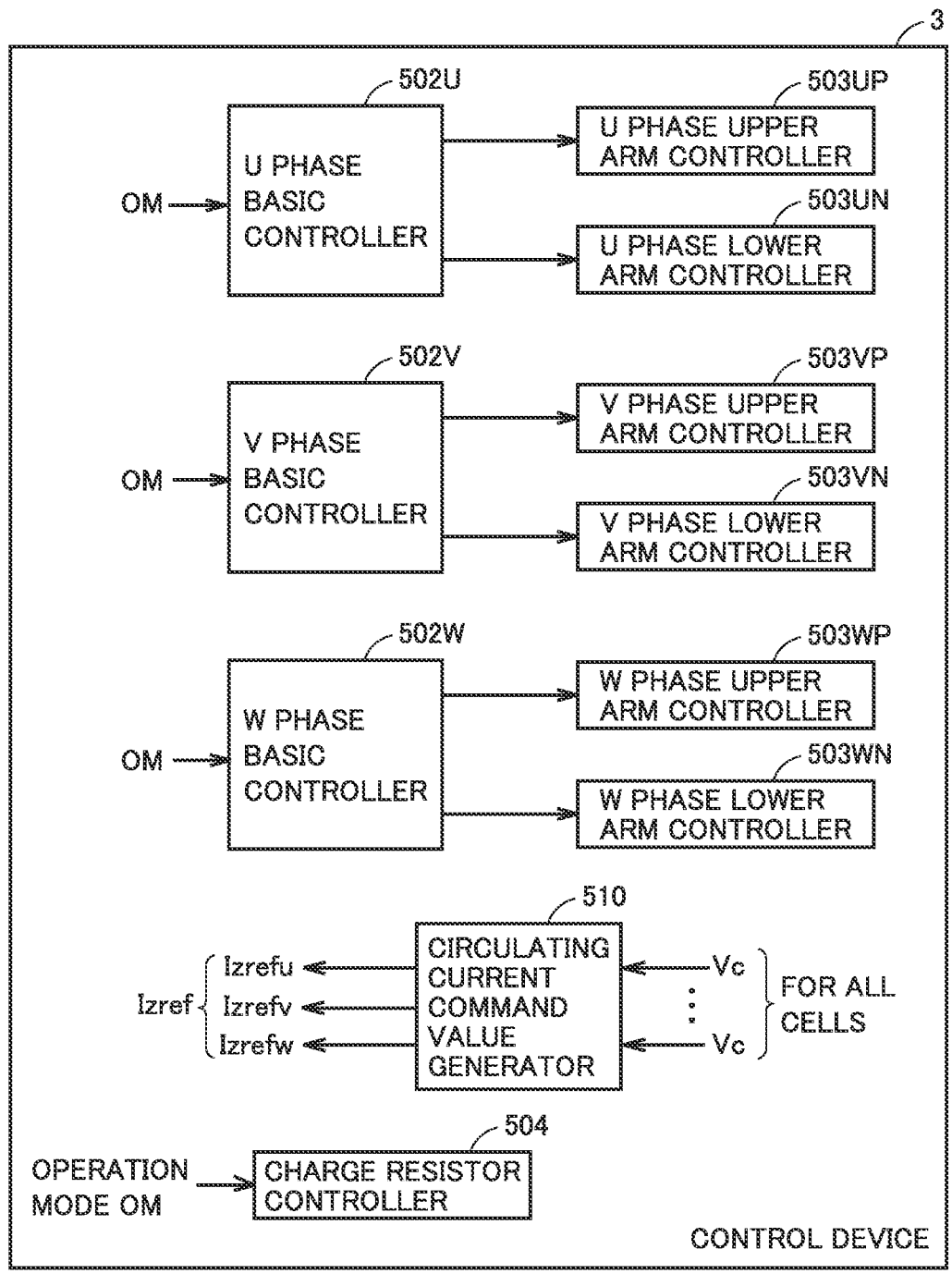
FIG. 19 is a functional block diagram illustrating an internal configuration of a control device in the power conversion device in the fifth embodiment.

FIG. 19 is a functional block diagram illustrating an internal configuration of control device 3 in power conversion device 1 in the fifth embodiment. Control device 3 in FIG. 19 differs from control device 3 in FIG. 4 in that it further includes a charge resistance controller 504 for controlling bypass switch 15. The other parts in FIG. 19 are the same as those in FIG. 4 and the same or corresponding parts are denoted by the same reference signs and will not be further elaborated.

Charge resistance controller 504 performs control to close bypass switch 15 in the normal operation mode. This allows arm current Iarm to bypass, thereby preventing loss increase of power converter 2 by charge resistor 18. Charge resistance controller 504 opens bypass switch 15 in the discharge operation mode. This allows arm current Iarm to flow through charge resistor 18, thereby increasing loss of power converter 2.

[Operation Procedure of Charge Resistance Controller]

Figure 20:
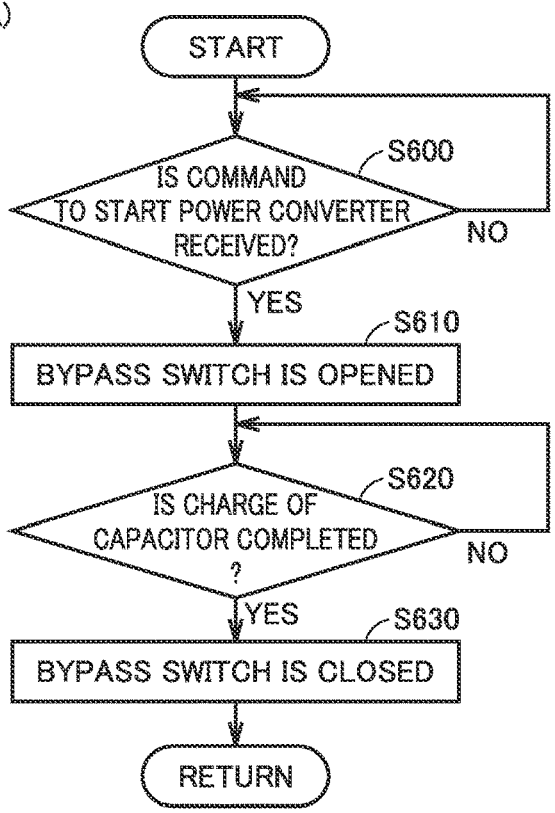
FIG. 20 is a flowchart illustrating the operation of a charge resistance controller.
Figure 20:
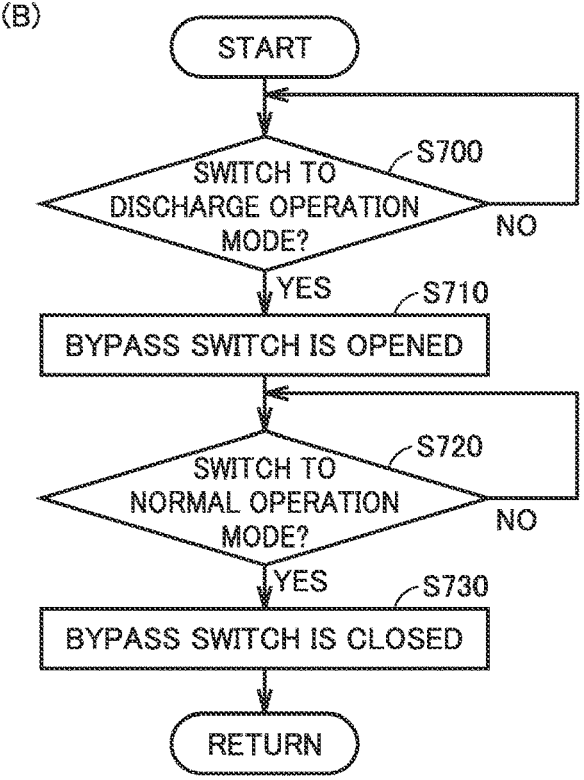

FIG. 20 is a flowchart illustrating the operation of the charge resistance controller. The flowchart (A) in FIG. 20 shows the operation of charge resistance controller 504 at startup of power converter 2, and the flowchart (B) in FIG. 20 shows the operation of charge resistance controller 504 in the discharge operation mode.

Referring to (A) in FIG. 20, in an initial state, it is assumed that power converter 2 is stopped. Upon receiving a command to start power converter 2 (YES at step S600), control device 3 proceeds to step S610. At step S610, charge resistance controller 504 of control device 3 opens each bypass switch 15. This suppresses charge current of capacitor 32 of each converter cell 7.

When capacitor voltage Vc detected by voltage detector 33 reaches a reference value, control device 3 determines that the charge of capacitor 32 is completed (YES at step S620). In this case, at the next step S630, charge resistance controller 504 of control device 3 closes each bypass switch 15.

Referring to (B) in FIG. 20, in an initial state, it is assumed that control device 3 is in the normal operation mode and each bypass switch 15 is closed.

If the normal operation mode is switched to the discharge operation mode (YES at step S700), control device 3 proceeds to step S710. At step S710, charge resistance controller 504 of control device 3 opens each bypass switch 15. This allows arm current Iarm to flow through charge resistor 18 and increases loss of power converter 2, thereby accelerating discharge of capacitor 32.

If the discharge operation mode is switched to the normal operation mode (YES at step S720), control device 3 proceeds to step S730. At step S730, charge resistance controller 504 of control device 3 closes each bypass switch 15.

Effect of Fifth Embodiment

As described above, in power conversion device 1 in the fifth embodiment, charge resistor 18 provided in each arm is used to increase loss by circulating current Iz in the discharge operation mode. This can accelerate discharge of capacitor 32 in the discharge operation mode.

Embodiments disclosed here should be understood as being illustrative rather than being limitative in all respects. The scope of the subject application is shown not in the foregoing description but in the claims, and it is intended that all modifications that come within the meaning and range of equivalence to the claims are embraced here.

REFERENCE SIGNS LIST 1 power conversion device, 2 power converter, 3 control device, 4 leg circuit, 5 upper arm, 6 lower arm, 7 converter cell, 8A, 8B reactor, 9A, 9B arm current detector, 10 AC voltage detector, 11A, 11B DC voltage detector, 12 AC circuit, 13 transformer, 14 DC circuit, 15 bypass switch, 16 AC current detector, 17 DC current detector, 18 charge resistor, 19 AC circuit breaker, 23A, 23B DC circuit breaker, 31 switching element, 32 capacitor (power storage element), 33 voltage detector, 34 gate resistor, 74 CPU, 75 RAM, 76 ROM, 78 auxiliary storage device, 202 individual cell controller, 203 carrier generator, 205 individual voltage controller, 206 adder, 207 gate signal generator, 208 gate drive controller, 502 basic controller, 503 arm controller, 504 charge resistance controller, 601 arm voltage command generator, 602 capacitor voltage command generator, 603 AC current controller, 604 DC current controller, 605 circulating current controller, 606 command distributor, 607 discharge controller, Iacref AC current command value, Iac AC current, Iarm arm current, Idc DC current, Idcref DC current command value, Iz circulating current, Izref circulating current command value, Nn low potential-side DC terminal, Np high potential-side DC terminal, Nu, Nv, Nw AC input terminal, P1, P2 input/output terminal, Vsysu, Vsysv, Vsysw AC voltage, Vc capacitor voltage, Vcr AC control command value, Vcref, Vcrefn, Vcrefp capacitor voltage command value, Vdc DC voltage, Vdcref DC voltage command value, Vdcr DC control command value, Vzr circulating control command value, fc carrier frequency, ga gate signal.

The invention claimed is:

1. A power conversion device comprising:
a power converter including a plurality of arms each having a plurality of converter cells cascaded to each other; and
a control device to control the power converter, wherein
each of the arms is electrically connected to a corresponding phase of an AC circuit,
each of the converter cells includes:
a pair of input/output terminals;
a plurality of switching elements; and
a power storage element electrically connected to the input/output terminals through the switching elements, the control device includes:
- an AC current controller to control AC current flowing between the power converter and the AC circuit; and
- a circulating current controller to control circulating current flowing between the arms of the power converter, the circulating current controller controls the circulating current such that an imbalance in voltage of the power storage elements between different arms is eliminated, in a first operation mode, the circulating current controller lowers a voltage of the power storage element of each of the converter cells constituting the power converter by increasing an effective value or amplitude value of the circulating current in a second operation mode, compared with in the first operation mode, and the AC current controller reduces an effective value or amplitude value of the AC current in the second operation mode, compared with in the first operation mode.

2. The power conversion device according to claim 1, wherein, in the second operation mode, the circulating current controller changes an effective value or amplitude value of the circulating current in accordance with a voltage decrease of the power storage element.

3. The power conversion device according to claim 2, wherein, in the second operation mode, the circulating current controller changes an effective value or amplitude value of the circulating current such that a peak value of arm current agrees with an upper limit of current determined by a safety operating area of each of the switching elements of each of the converter cells.

4. The power conversion device according to claim 1, wherein
- the control device controls an output voltage of each of the converter cells by phase shift pulse width modulation, and
- the control device increases a carrier frequency in the phase shift pulse width modulation in the second operation mode, compared with in the first operation mode.

5. The power conversion device according to claim 1, wherein
- switching loss of each of the switching elements provided in each of the converter cells is changed by control from the control device, and
- the control device increases switching loss of each of the switching elements provided in each of the converter cells in the second operation mode, compared with in the first operation mode.

6. The power conversion device according to claim 5, wherein
- a gate resistance of each of the switching elements provided in each of the converter cells is changed by control from the control device, and
- the control device increases the switching loss by increasing the gate resistance in the second operation mode, compared with in the first operation mode.

7. The power conversion device according to claim 1, wherein
- each of the arms further includes a charge resistor connected in series with the converter cells and a bypass switch connected in parallel with the charge resistor, and
- the control device opens the bypass switch in the second operation mode and closes the bypass switch in the first operation mode.

8. The power conversion device according to claim 1, wherein the control device switches an operation mode from the first operation mode to the second operation mode when a voltage of at least one of the power storage elements in the converter cells exceeds a threshold.

9. The power conversion device according to claim 1, wherein when receiving a command to stop operation of the power converter, the control device switches an operation mode from the first operation mode to the second operation mode.

* * * * *